(12) United States Patent
Sakurai et al.

(10) Patent No.: US 7,434,976 B2
(45) Date of Patent: Oct. 14, 2008

(54) DOUBLE-SIDE DISPLAY DEVICE WITH SURFACE LIGHT SOURCE DEVICE HAVING DEFLECTION PATTERNS

(75) Inventors: Kenji Sakurai, Kyotanabe (JP); Makoto Ohhira, Kusatsu (JP); Gouo Kurata, Nara (JP); Akihiro Funamoto, Nara (JP); Shigeru Aoyama, Kyoto (JP)

(73) Assignee: OMRON Corporation, Kyoto (JP)

( * ) Notice: Subject to any disclaimer, the term of this patent is extended or adjusted under 35 U.S.C. 154(b) by 223 days.

(21) Appl. No.: 11/376,875

(22) Filed: Mar. 16, 2006

(65) Prior Publication Data

US 2006/0209567 A1    Sep. 21, 2006

(30) Foreign Application Priority Data

Mar. 16, 2005    (JP)    ............................. 2005-075123

(51) Int. Cl.
*F21V 7/04*    (2006.01)

(52) U.S. Cl. .................. 362/626; 362/620; 362/623; 362/561; 362/559; 349/62; 40/547; 40/572

(58) Field of Classification Search ................. 362/620, 362/626, 561, 623, 559, 615, 625, 627; 349/62–65; 40/547, 572

See application file for complete search history.

(56) References Cited

U.S. PATENT DOCUMENTS

2001/0010630 A1    8/2001    Umemoto

2004/0012726 A1    1/2004    Kano et al.
2004/0027513 A1    2/2004    Yuuki et al.
2005/0002175 A1    1/2005    Matsui et al.

FOREIGN PATENT DOCUMENTS

| EP | 1271223 | 1/2003 |
|---|---|---|
| WO | WO-03/087900 | 10/2003 |
| WO | WO-2004/040361 | 5/2004 |

OTHER PUBLICATIONS

European Search Report dated Aug. 9, 2006 in Applicaiton No. 06111050.8 (8 pages).

*Primary Examiner*—Ismael Negron
(74) *Attorney, Agent, or Firm*—Osha • Liang LLP

(57) ABSTRACT

A double-side LCD having a surface light source device including a light guide plate and a light source facing one end face of the light guide plate. A plurality of deflection patterns are formed in a surface facing a light outgoing plane of the light guide plate, the deflection pattern includes an inclined plane facing the light source side and a re-incident plane substantially perpendicular to the light outgoing plane. Light from the light source is reflected by the inclined plane and outputted from the light outgoing plane to the LCD. A tilt angle ($\alpha$) of the inclined plane satisfies: $45°-[\mathrm{Sin}^{-1}(\mathrm{Sin}\,\theta/n)]/2 \leq \alpha \leq 45°+[\mathrm{Sin}^{-1}(\mathrm{Sin}\,\theta/n)]/2$, wherein $\theta$ is an angle between a direction of peak brightness of outputted light and a direction perpendicular to the light outgoing plane, n is a refractive index of the light guide plate, and $\theta$ is within 6-15°.

11 Claims, 30 Drawing Sheets

Fig. 7

| Item | | Sample 1 | Sample 2 | Sample 3 | Sample 4 | Sample 5 |
|---|---|---|---|---|---|---|
| LCD | Transmittance (%) | 6.5 | 6.5 | 6.5 | 6.5 | 6.5 |
| | Reflectance (%) | 6.5 | 6.5 | 6.5 | 6.5 | 6.5 |
| Light guide plate | Peak brightness (cd/m$^2$) | 3000 | 3000 | 3000 | 3000 | 3000 |
| | N/P brightness ratio (%) | 55 | 50 | 45 | 35 | 30 |
| | Outgoing peak angle (deg) | 6 | 7 | 8 | 9 | 10 |
| Look on BL side | BL-side peak brightness (cd/m$^2$) | 195 | 195 | 195 | 195 | 195 |
| | BL-side front face brightness (cd/m$^2$) | 107 | 98 | 88 | 68 | 59 |
| Look on FL side | Noise brightness (normal direction) (cd/m$^2$) | 17.0 | 15.5 | 13.9 | 10.8 | 9.3 |
| | Signal brightness (normal direction) (cd/m$^2$) | 151 | 146 | 141 | 132 | 127 |
| | Contrast ratio | 8.9 | 9.4 | 10.1 | 12.1 | 13.6 |

| | Sample 6 | Sample 7 | Sample 8 | Sample 9 | Sample 10 |
|---|---|---|---|---|---|
| | 6.5 | 6.5 | 6.5 | 6.5 | 6.5 |
| | 6.5 | 6.5 | 6.5 | 6.5 | 6.5 |
| | 3000 | 3000 | 3000 | 3000 | 3000 |
| | 25 | 20 | 18 | 15 | 14 |
| | 11 | 12 | 13 | 14 | 15 |
| | 195 | 195 | 195 | 195 | 195 |
| | 49 | 39 | 35 | 29 | 27 |
| | 7.7 | 6.2 | 5.6 | 4.6 | 4.3 |
| | 122 | 111 | 103 | 93 | 83 |
| | 15.7 | 17.8 | 18.5 | 20.0 | 19.1 |

Fig. 16

| Item | | Sample 11 | Sample 12 | Sample 13 | Sample 14 | Sample 15 |
|---|---|---|---|---|---|---|
| LCD | Transmittance (%) | 6.5 | 6.5 | 6.5 | 6.5 | 6.5 |
| | Reflectance (%) | 13.0 | 13.0 | 13.0 | 13.0 | 13.0 |
| Light guide plate | Peak brightness (cd/m²) | 3000 | 3000 | 3000 | 3000 | 3000 |
| | N/P brightness ratio (%) | 80 | 70 | 60 | 55 | 50 |
| | Outgoing peak angle (deg) | 3 | 4 | 5 | 6 | 7 |
| Look on BL side | BL-side peak brightness (cd/m²) | 195 | 195 | 195 | 195 | 195 |
| | BL-side front face brightness (cd/m²) | 156 | 137 | 117 | 107 | 98 |
| Look on FI side | Noise brightness (normal direction) (cd/m²) | 31.8 | 27.8 | 23.9 | 21.9 | 19.9 |
| | Signal brightness (normal direction) (cd/m²) | 273 | 263 | 254 | 249 | 244 |
| | Contrast ratio | 8.6 | 9.5 | 10.6 | 11.4 | 12.3 |

| Sample 16 | Sample 17 | Sample 18 | Sample 19 | Sample 20 | Sample 21 | Sample 22 | Sample 23 |
|---|---|---|---|---|---|---|---|
| 6.5 | 6.5 | 6.5 | 6.5 | 6.5 | 6.5 | 6.5 | 6.5 |
| 13.0 | 13.0 | 13.0 | 13.0 | 13.0 | 13.0 | 13.0 | 13.0 |
| 3000 | 3000 | 3000 | 3000 | 3000 | 3000 | 3000 | 3000 |
| 45 | 35 | 30 | 25 | 20 | 18 | 15 | 14 |
| 8 | 9 | 10 | 11 | 12 | 13 | 14 | 15 |
| 195 | 195 | 195 | 195 | 195 | 195 | 195 | 195 |
| 88 | 68 | 59 | 49 | 39 | 35 | 29 | 27 |
| 17.9 | 13.9 | 11.9 | 9.9 | 8.0 | 7.2 | 6.0 | 5.6 |
| 239 | 229 | 224 | 219 | 202 | 188 | 171 | 152 |
| 13.4 | 16.5 | 18.8 | 22.1 | 25.4 | 26.3 | 28.7 | 27.4 |

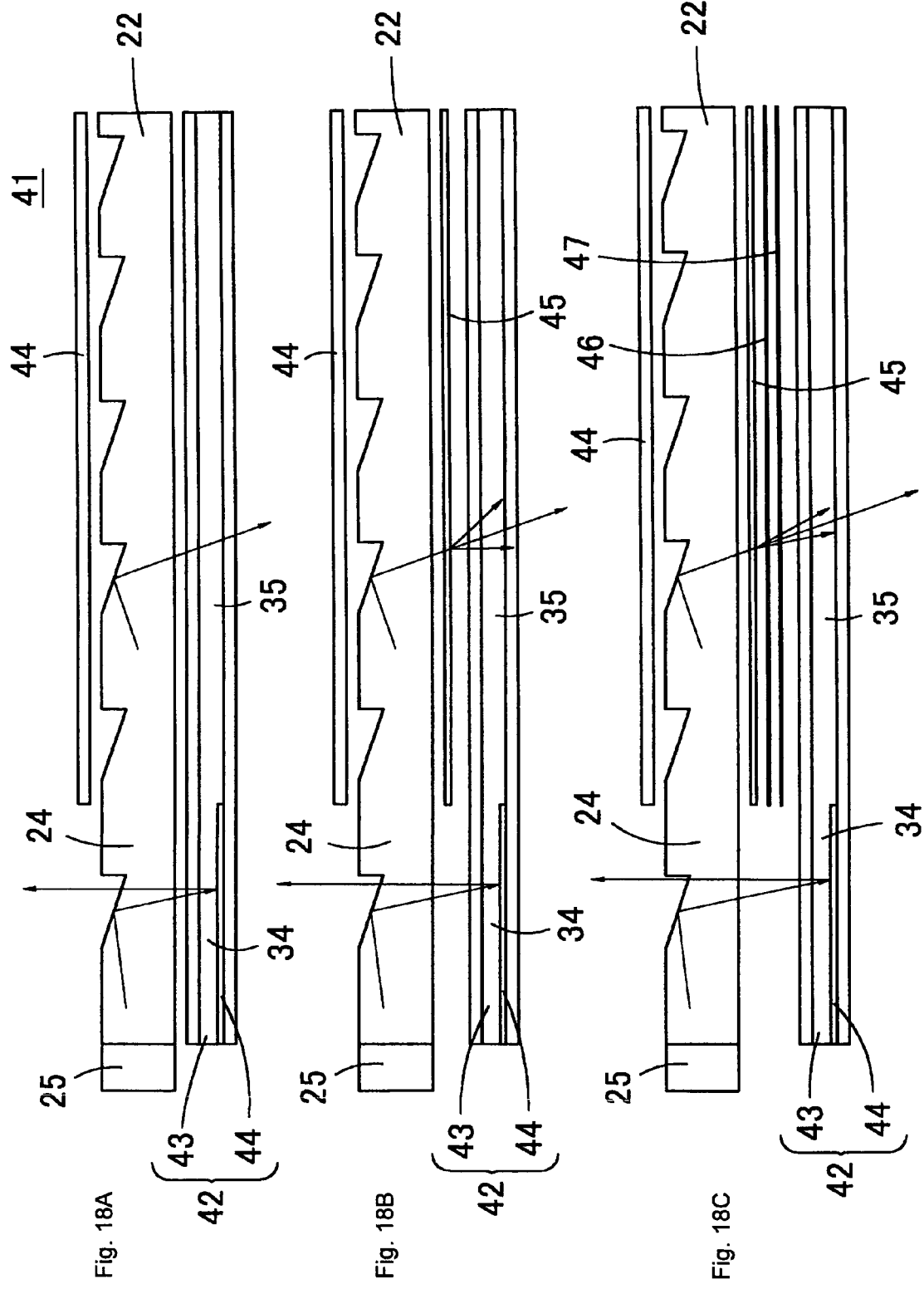

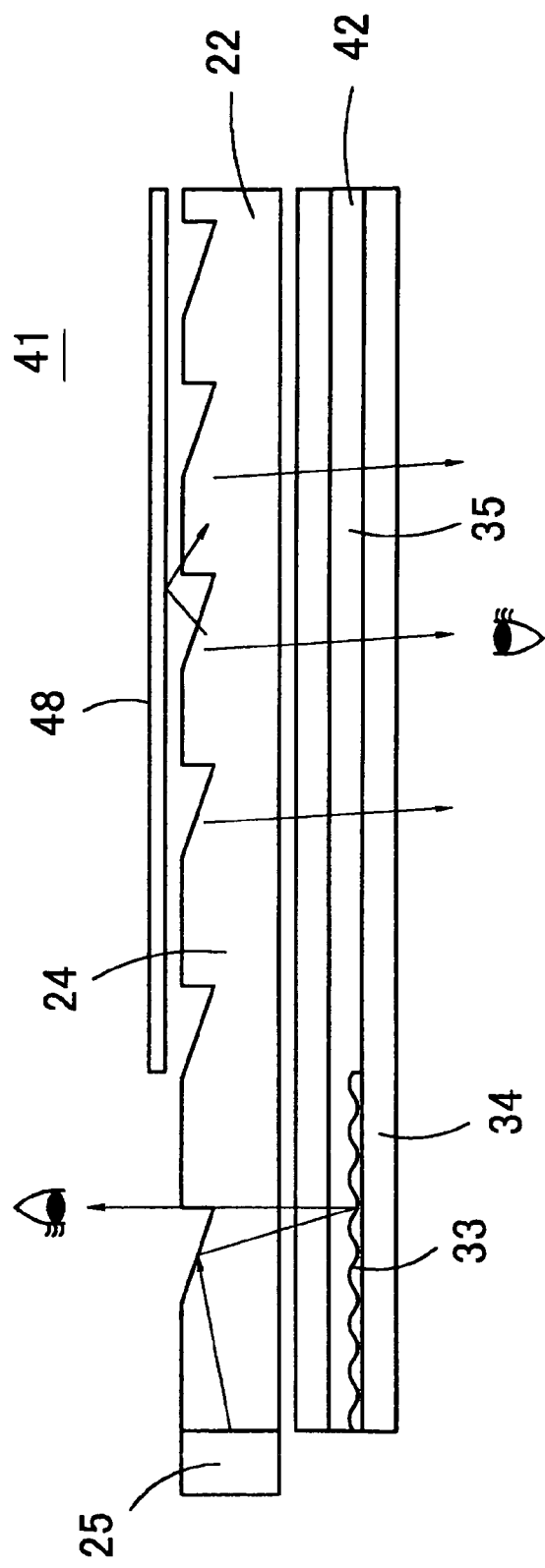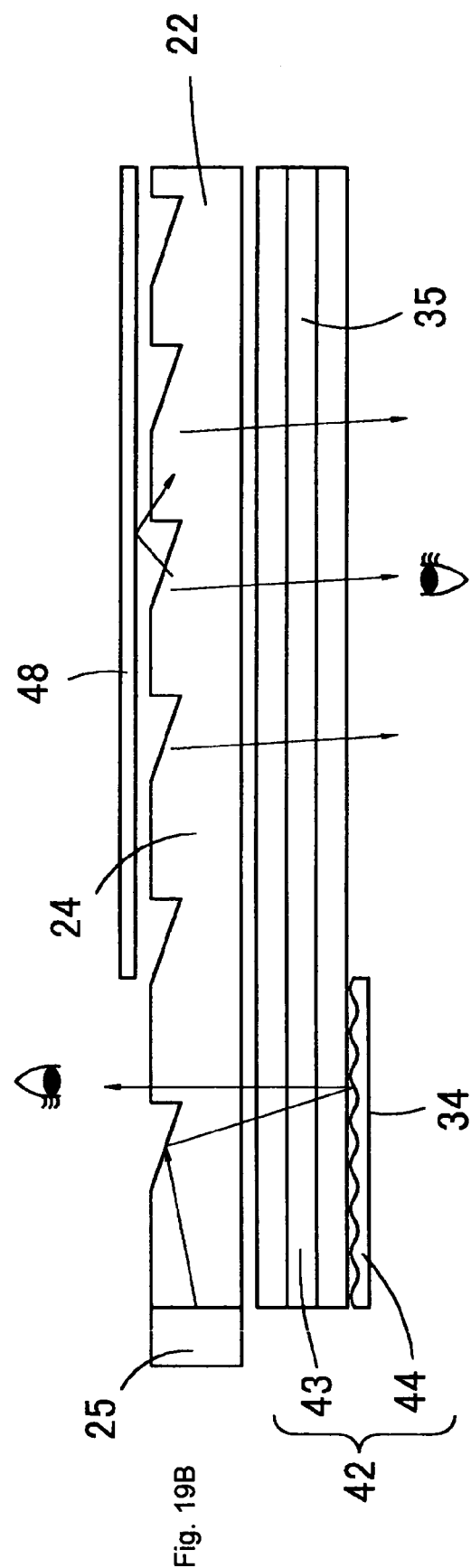

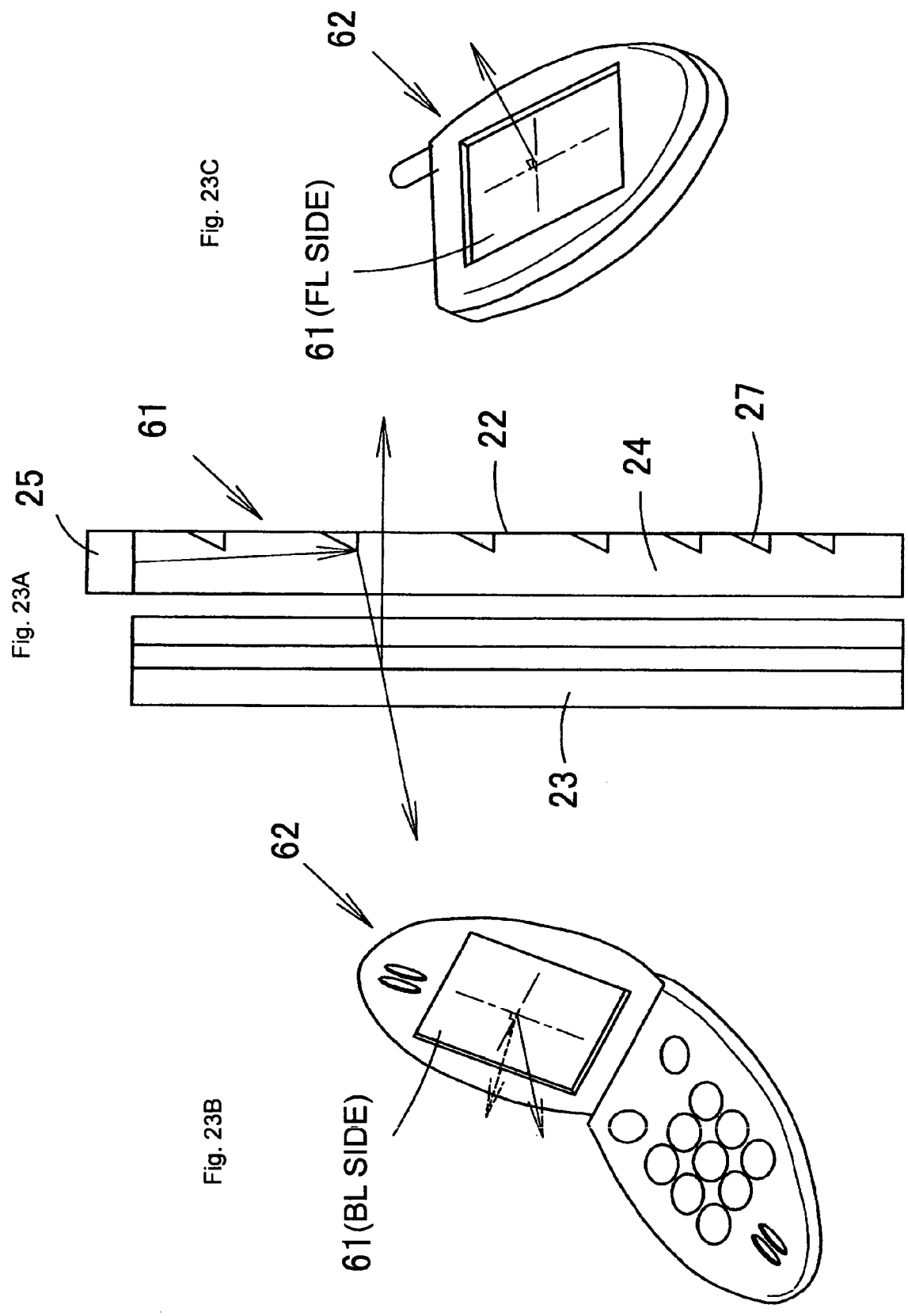

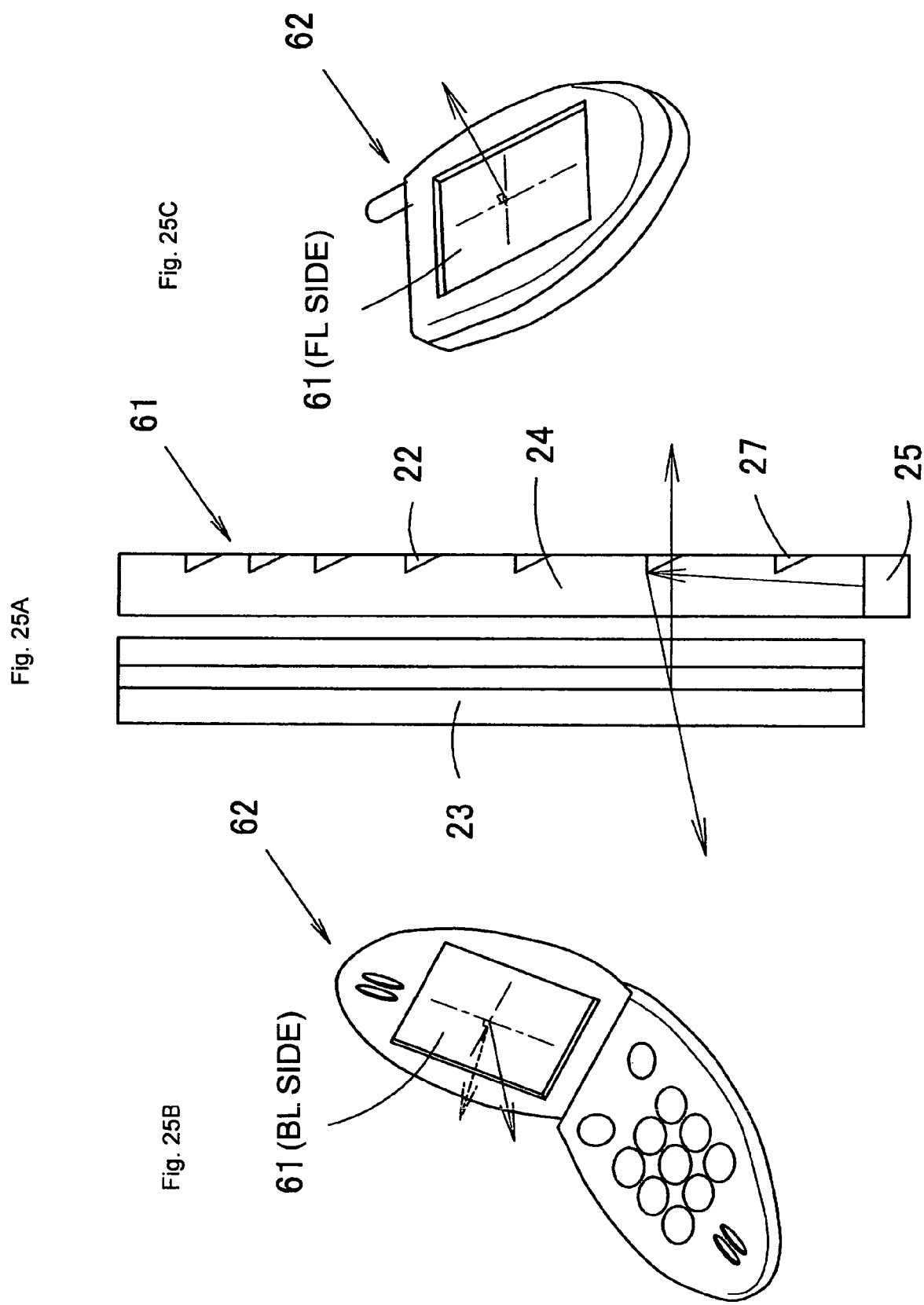

DOUBLE-SIDE DISPLAY DEVICE WITH SURFACE LIGHT SOURCE DEVICE HAVING DEFLECTION PATTERNS

BACKGROUND OF THE INVENTION

1. Field of the Invention

The present invention relates to a double-side display device and surface light source device.

2. Description of the Related Art

FIG. 1 is a schematic sectional view showing an example of a conventional double-side display device. A double-side display device 11 includes a reversible light 12 and a semi-transmissive liquid crystal panel 13. The reversible light 12 is a surface light source device having function of uniformly emitting light and transparency, and the reversible light 12 is also a surface light source device having both back light function and front light function. The reversible light 12 is arranged while facing the semi-transmissive liquid crystal panel 13. The reversible light 12 is one in which a light source 15 such as a cold-cathode tube is arranged while facing an end face (light incident plane) of a light guide plate 14. A fine corrugated surface 17 is formed in the opposite surface to a light outgoing plane 16 of the light guide plate 14. In the following description, the opposite side to the semi-transmissive liquid crystal panel 13 with respect to the reversible light 12 is referred to as front light side, and the opposite side to the reversible light 12 with respect to the semi-transmissive liquid crystal panel 13 is referred to as back light side. A light beam is indicated by an arrow, and noise light is indicated by a broken-line arrow except as otherwise noted.

In the double-side display device 11, as shown in FIG. 1, the light emitted from the light source 15 is incident into the light guide plate 14 from the end face of the light guide plate 14, the light propagates through the light guide plate 14 by repeating total reflection at the light outgoing plane 16 and its opposite surface of the light guide plate 14, and the light spreads in the whole of the light guide plate 14. At this point, in the light scattered by a fine corrugated surface 17, the light incident to the light outgoing plane 16 with a small incident angle is transmitted through the light outgoing plane 16 and outputted to the outside from the reversible light 12.

Part of the light outputted from the reversible light 12 is transmitted through a transmission region of the semi-transmissive liquid crystal panel 13 and outputted to the back light side. Part of the light outputted from the reversible light 12 is reflected by a reflecting region of the semi-transmissive liquid crystal panel 13 and outputted to the front light side. Therefore, when viewed from the back light side, the reversible light 12 function as the back light so as to visually recognize an image generated by the semi-transmissive liquid crystal panel 13. When viewed from the front light side, the reversible light 12 function as the front light so as to visually recognize the image generated by the semi-transmissive liquid crystal panel 13.

In the double-side display device having the above configuration, because each one of the reversible light 12 and the semi-transmissive liquid crystal panel 13 is required, the number of components is decreased, which leads to merits such as inexpensive production of the double-side display device 11, a low profile, and weight reduction. However, in the double-side display device 11, there is a problem that contrast is low due to the noise light when viewed from the front light side.

FIG. 2 is a view for explaining the reason why the contrast is low on the front light side in the conventional double-side display device. Assuming that a light quantity of the light incident into the light guide plate 14 from the light source 15 is set at "100", in the light reflected toward the light out going plane 16 by the fine corrugated surface 17, the light quantity of "0.5" is reflected by the light outgoing plane 16 and outputted to the front light side, and the light quantity of "0.5" is reflected by the surface of the semi-transmissive liquid crystal panel 13 and outputted to the front light side in the light quantity of "99.5" of the light outputted from the light outgoing plane 16 of reversible light 12. Accordingly, the light having the light quantity of "99" is incident into the semi-transmissive liquid crystal panel 13, and only the light quantity of "6.4" is reflected by the inside of the semi-transmissive liquid crystal panel 13 and outputted in the form of signal light (image) to the front light side. Similarly only the light quantity of "6.4" is transmitted through the semi-transmissive liquid crystal panel 13 and outputted in the form of signal light (image) to the back light side. Therefore, on the front light side, the noise light is "0.5"+"0.5"="1.0" to the signal light of "6.4" which becomes the image, and the image contrast is 6.4:1 (hereinafter light quantity ratio of the signal light to the noise light is referred to as contrast ratio). Thus, since the proportion of the noise light is large, the image contrast is low, and the image quality is worse on the front light side.

FIG. 3 shows a method of improving the contrast on the front light side. In the double-side display device 11, the light is outputted from the reversible light 12 while inclined from a direction perpendicular to the light outgoing plane 16, and the light is reflected toward the direction perpendicular to the light outgoing plane 16 by the reflecting region of the semi-transmissive liquid crystal panel 13. On the front light side, while the signal light is outputted toward the direction perpendicular to the double-side display device 11, the noise light which is normally reflected from the surfaces of the light outgoing plane 16 and the semi-transmissive liquid crystal panel 13 is outputted toward the oblique direction. Therefore, the noise light indicated by the broken-line arrow is not incident to eyes to suppress the decrease in contrast when the double-side display device 11 is viewed from the front face on the front light side.

However, in the double-side display device 11 having the above structure, when an outgoing peak angle θ is small in the light outputted from the light outgoing plane 16 of the reversible light 12, the contrast is worsened on the front light side by the reason described in FIG. 2 (see FIG. 2). The outgoing peak angle θ is an angle made by a normal perpendicular to the light outgoing plane 16 and a peak brightness direction in which brightness of the light outputted from the light outgoing plane 16 is maximized. As shown in FIG. 4, when the outgoing peak angle θ is excessively large, front face brightness is decreased to be hardly visible from the front face on the back light side.

Accordingly, for the conventional double-side display device, it is demanded that the good-look image is obtained when the double-side display device is viewed from both the front light side and the back light side, and particularly it is necessary to improve the contrast on the front light side and the brightness on the back light side.

SUMMARY OF THE INVENTION

Embodiments of the present invention provide a double-side display device and a surface light source device, in which the good-look image can be displayed when the double-side display device is viewed from both the front light side and the back light side.

In accordance with one aspect of the present invention, a surface light source device comprises a light guide plate which has a light outgoing plane in one of principal planes thereof; and a light source which is arranged while facing one of end faces of the light guide plate, wherein light emitted from the light source is incident to the light guide plate and the light spreads into the whole of the light guide plate while propagating through the light guide plate; a plurality of deflection patterns are formed in a surface facing the light outgoing plane of the light guide plate, the deflection pattern including an inclined plane located on a light source side and a re-incident plane substantially perpendicular to the light outgoing plane; the light in the light guide plate is reflected by the inclined plane and then the light is outputted from the light outgoing plane; and brightness of the light outputted from the light outgoing plane in a direction perpendicular to the light outgoing plane of the light guide plate ranges from 15% to 60% of peak brightness of the light outputted from the light outgoing plane.

In accordance with one aspect of the present invention, a double-side display device comprises a semi-transmissive liquid crystal panel in which a liquid crystal layer is sealed by sandwiching the liquid crystal layer between two glass substrates, the semi-transmissive liquid crystal panel having a reflecting region and a transmission region; and a surface light source device in which a light outgoing plane is placed to face the semi-transmissive liquid crystal panel, the surface light source device comprises a light guide plate which has a light outgoing plane in one of principal planes thereof; and a light source which is arranged while facing one of end faces of the light guide plate, wherein light emitted from the light source is incident to the light guide plate and the light spreads into the whole of the light guide plate while propagating through the light guide plate; a plurality of deflection patterns are formed in a surface facing the light outgoing plane of the light guide plate, the deflection pattern including an inclined plane located on a light source side and a re-incident plane substantially perpendicular to the light outgoing plane; the light in the light guide plate is reflected by the inclined plane and then the light is outputted from the light outgoing plane; and brightness of the light outputted from the light outgoing plane in a direction perpendicular to the light outgoing plane of the light guide plate ranges from 15% to 60% of peak brightness of the light outputted from the light outgoing plane.

In accordance with one aspect of the present invention, a handheld terminal comprising a double-side display device, the double-side display device comprises a semi-transmissive liquid crystal panel in which a liquid crystal layer is sealed by sandwiching the liquid crystal layer between two glass substrates, the semi-transmissive liquid crystal panel having a reflecting region and a transmission region; and a surface light source device in which a light outgoing plane is placed to face the semi-transmissive liquid crystal panel, the surface light source device comprises a light guide plate which has a light outgoing plane in one of principal planes thereof; and a light source which is arranged while facing one of end faces of the light guide plate, wherein light emitted from the light source is incident to the light guide plate and the light spreads into the whole of the light guide plate while propagating through the light guide plate; a plurality of deflection patterns are formed in a surface facing the light outgoing plane of the light guide plate, the deflection pattern including an inclined plane located on a light source side and a re-incident plane substantially perpendicular to the light outgoing plane; the light in the light guide plate is reflected by the inclined plane and then the light is outputted from the light outgoing plane; and brightness of the light outputted from the light outgoing plane in a direction perpendicular to the light outgoing plane of the light guide plate ranges from 15% to 60% of peak brightness of the light outputted from the light outgoing plane.

The above-described components of the invention can arbitrarily be combined as much as possible.

BRIEF DESCRIPTION OF THE DRAWINGS

FIG. 7 shows an evaluation result of image quality by a simulation on the front light side and the back light side when characteristics of a light guide plate are changed in the double-side display device of the first embodiment.

FIG. 16 shows an evaluation result of the image quality by the simulation on the front light side and the back light side when the characteristics of a light guide plate are changed in the double-side display device of the second embodiment.

FIGS. 18A, 18B, and 18C show schematic sectional views of modifications of a region splitting type double-side display device.

FIGS. 19A and 19B show schematic sectional view of modification of the region splitting type double-side display device.

FIG. 23A shows a schematic sectional view of a double-side display device according to a fifth embodiment of the invention, and FIGS. 23B and 23C show a perspective view of a mobile telephone in which the double-side display device of the fifth embodiment is incorporated into a display unit.

FIG. 25A shows a schematic sectional view of a double-side display device according to a modification of the fifth embodiment of the invention, and FIGS. 25B and 25C show a perspective view of the mobile telephone in which the double-side display device of the modification of the fifth embodiment is incorporated in the display unit.

DETAILED DESCRIPTION OF THE INVENTION

Preferred embodiments of the invention will be described in detail with reference to the drawings. The following embodiments are shown only by way of example, and the invention is not limited to the embodiments.

FIRST EMBODIMENT

Figure 1:
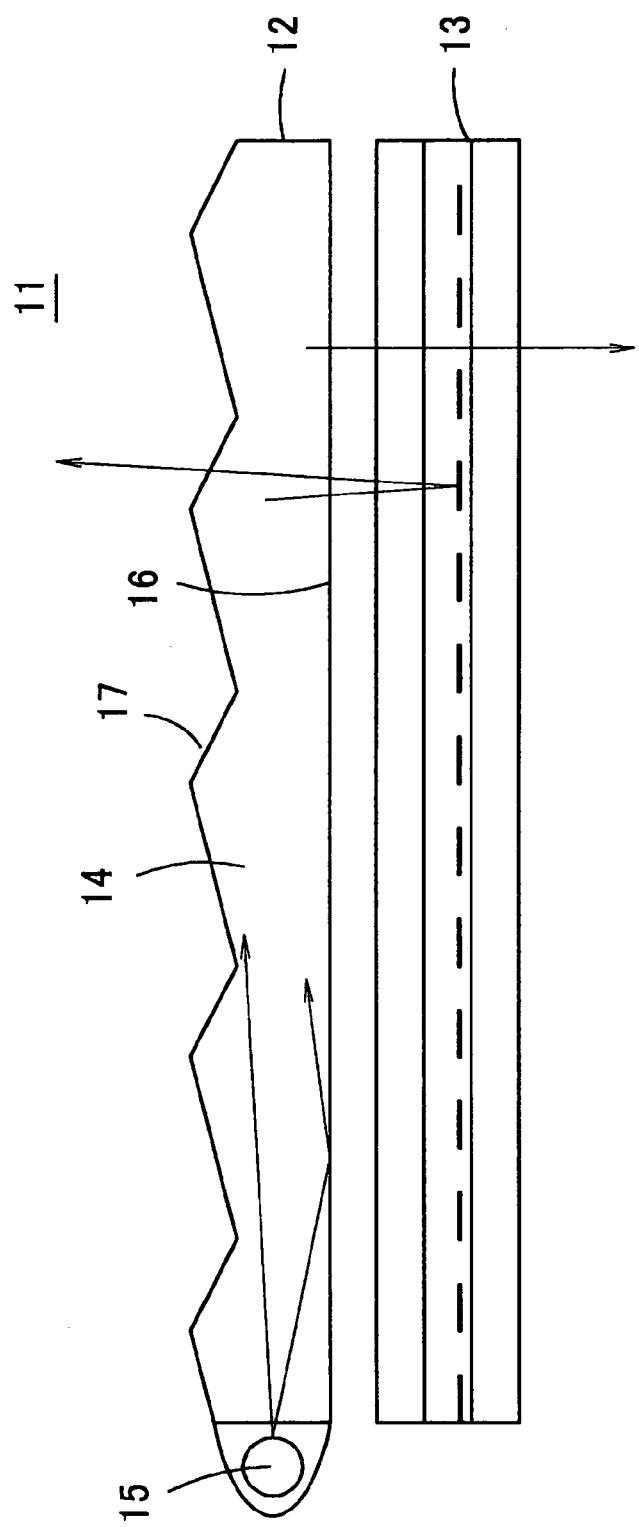
FIG. 1 shows a schematic sectional view of an example of a conventional double-side display device.
Figure 2:
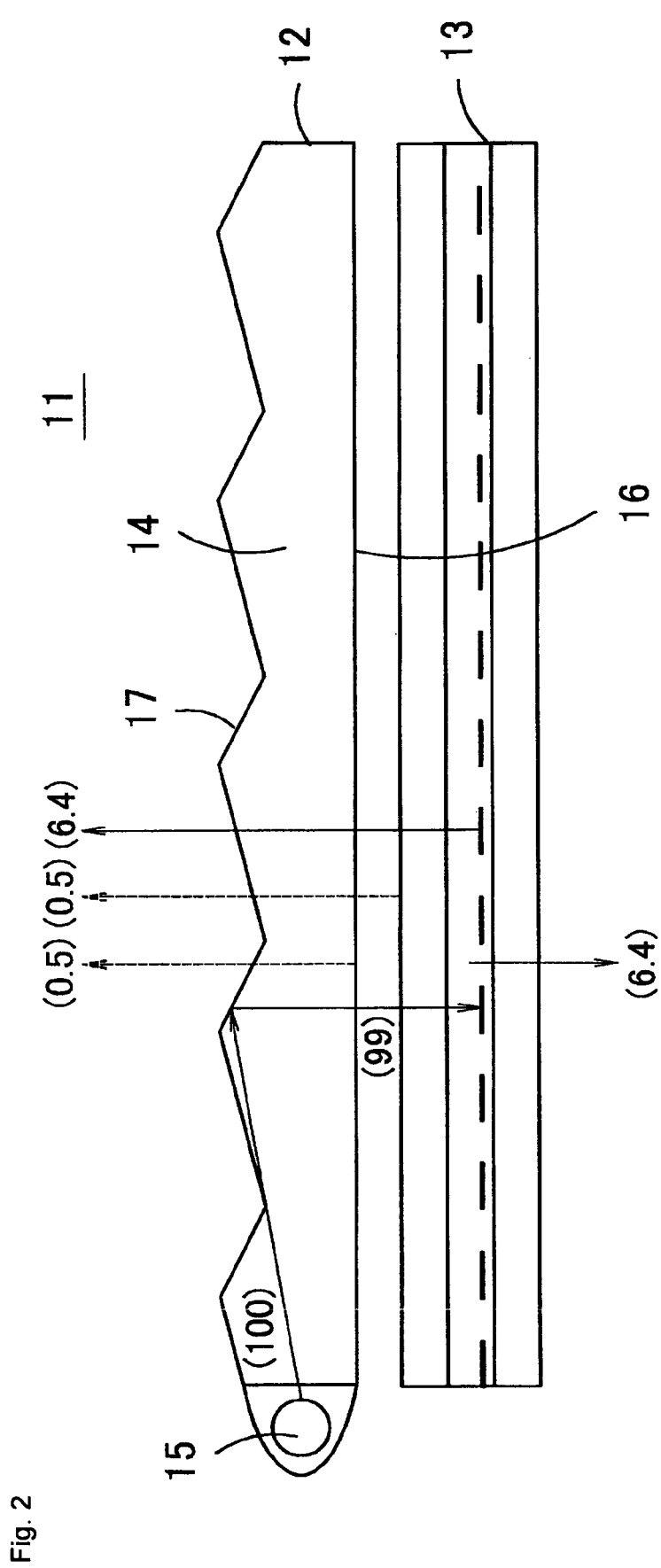
FIG. 2 shows an explanation of the reason why contrast is low on a front light side in the conventional double-side display device.
Figure 3:
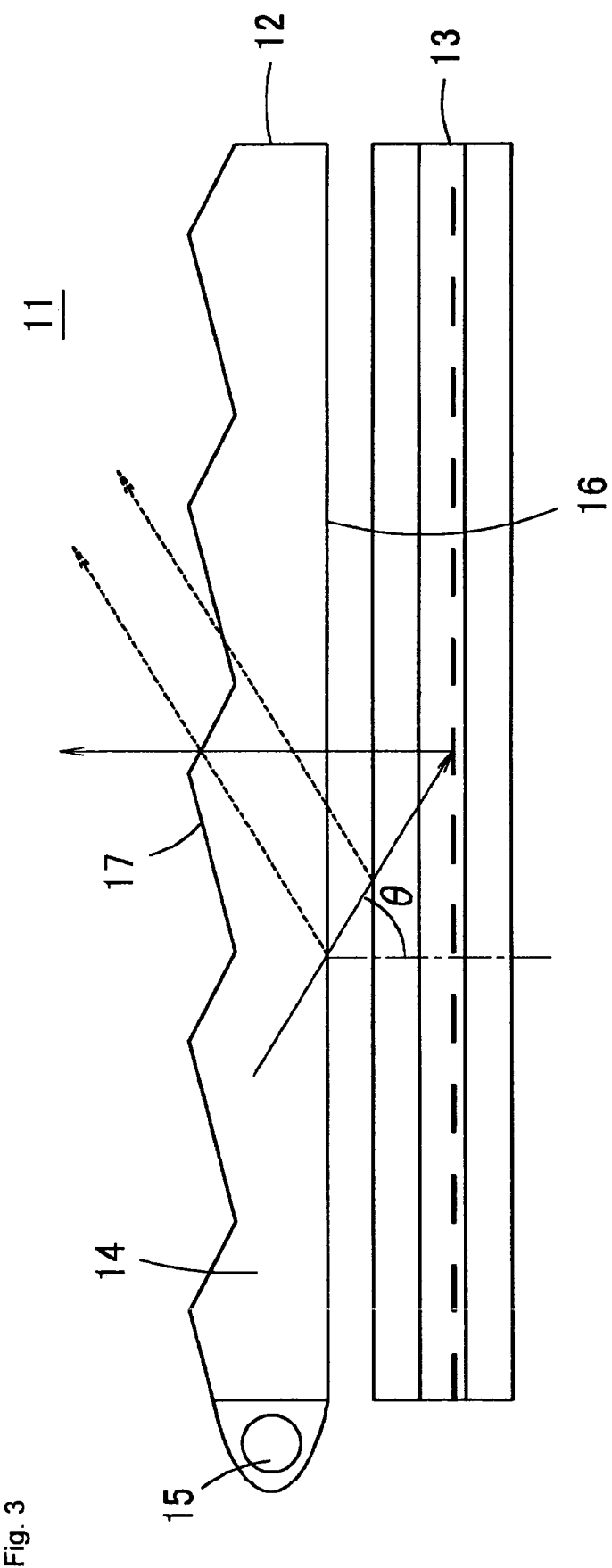
FIG. 3 shows an explanation of a method of improving the contrast on the front light side.
Figure 4:
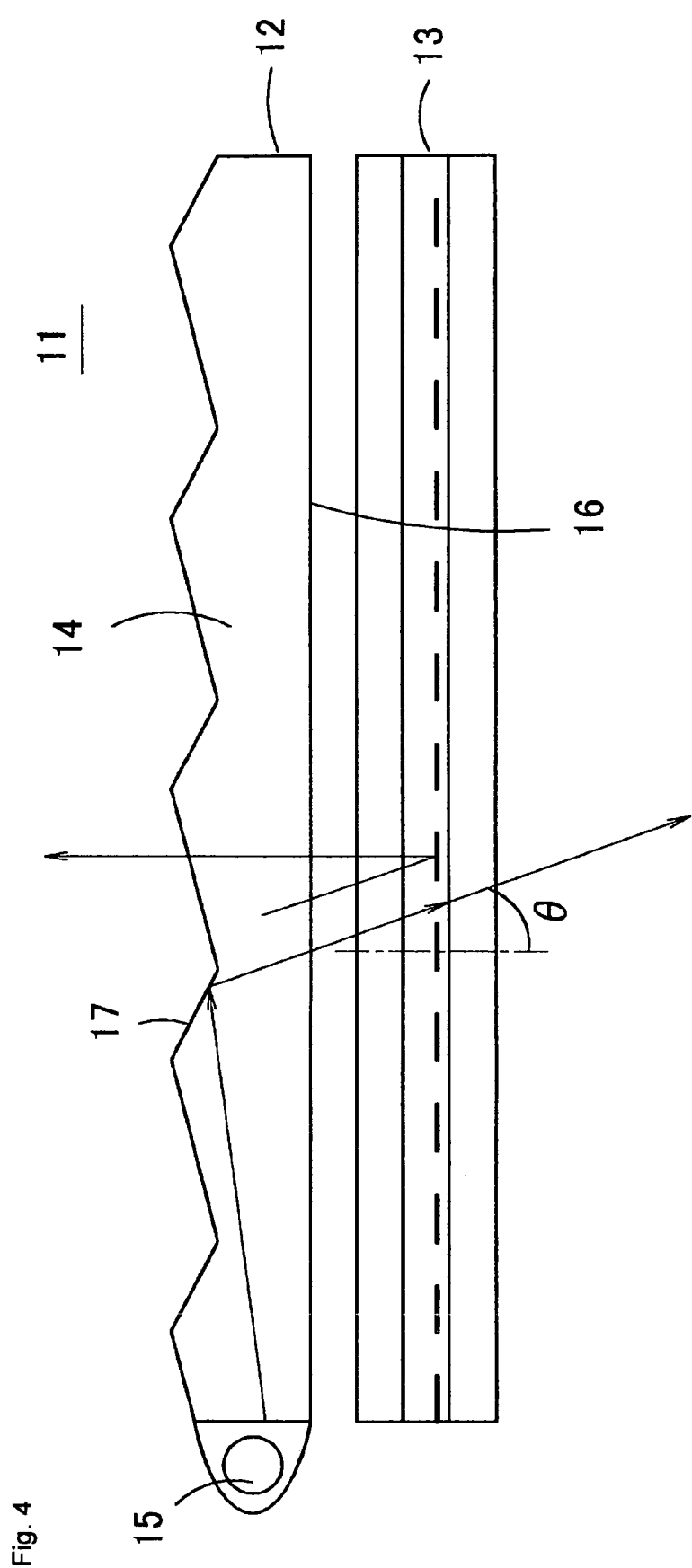
FIG. 4 shows an explanation of the reason why front face brightness of the conventional double-side display device is decreased on a back light side.
Figure 5:
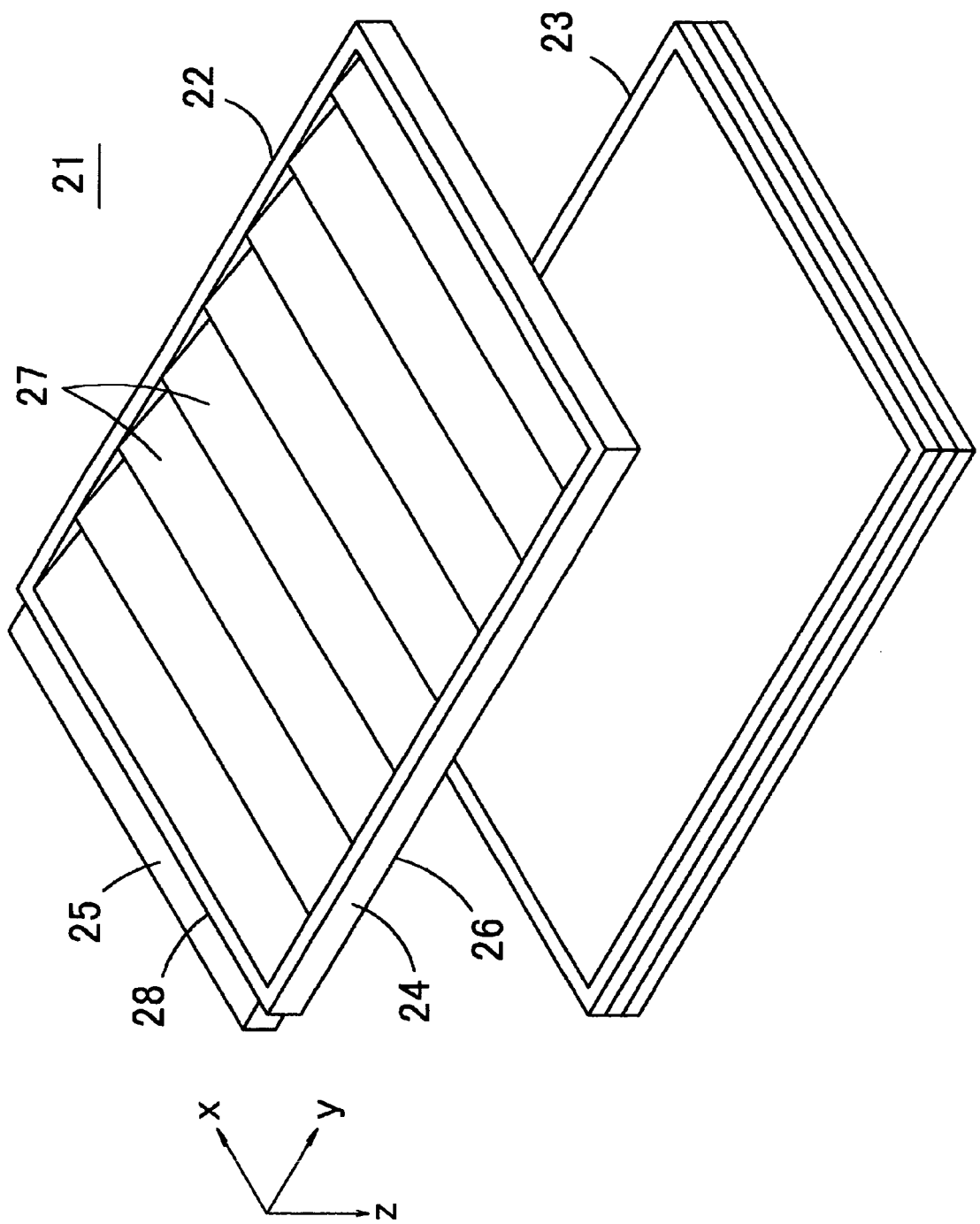
FIG. 5 shows an exploded perspective view of a double-side display device according to a first embodiment of the invention.
Figure 6:
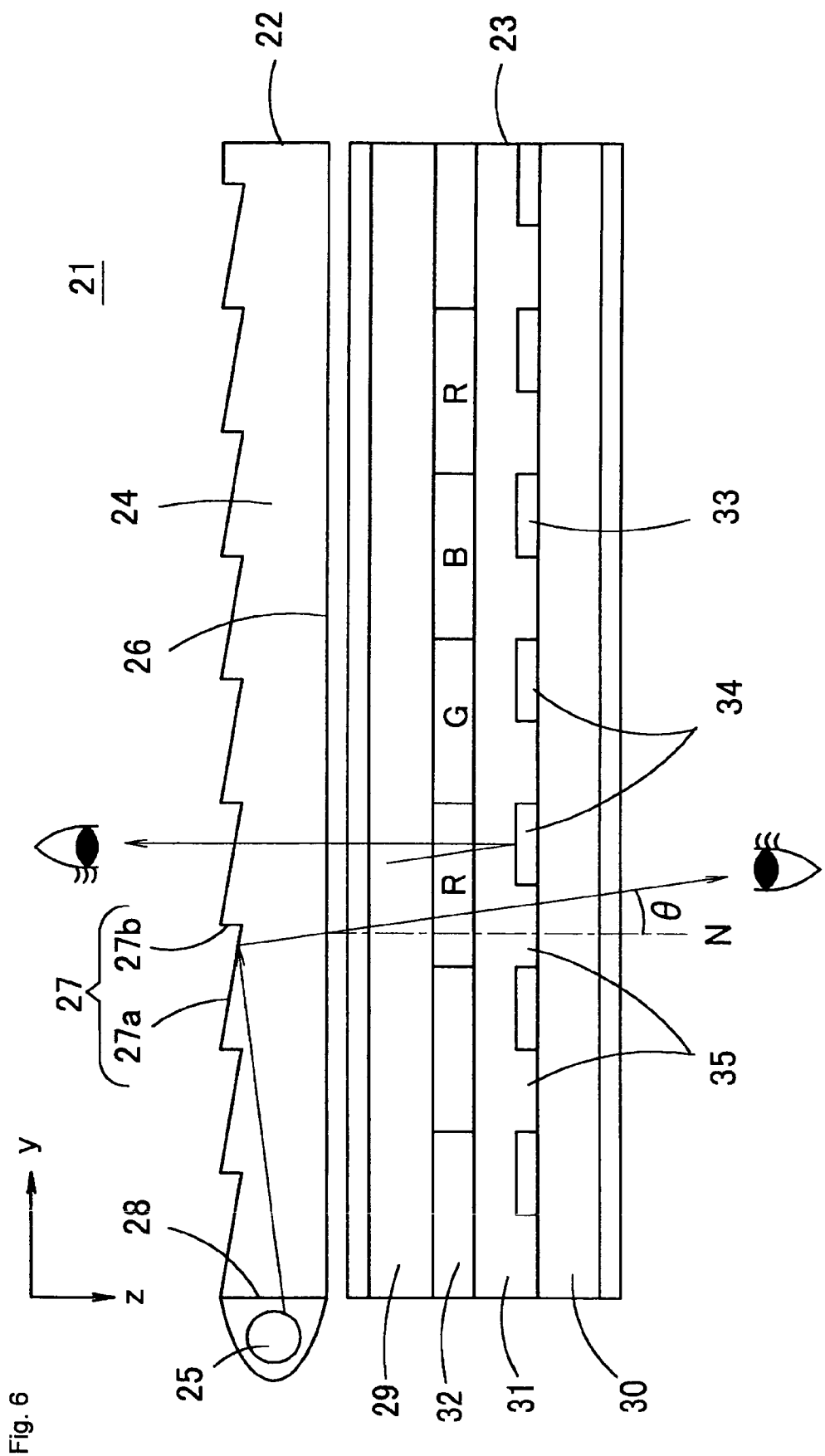
FIG. 6 shows a schematic sectional view of the double-side display device of the first embodiment.

FIG. 5 is an exploded perspective view showing a double-side display device according to a first embodiment of the invention, and FIG. 6 is a schematic sectional view thereof. A double-side display device 21 includes a reversible light 22 (surface light source device) and a semi-transmissive liquid crystal panel 23. The reversible light 22 includes a light guide plate 24 and light source 25. The light source 25 is arranged while facing one (light incident plane 28) of end faces of light guide plate 24. The light source 25 is a so-called linear light source. For example, the light source in which the cold-cathode tube is arranged, the light source in which plural LEDs are linearly arranged, or the light source in which the light emitted from one LED is linearly spread can be used as the light source 25. The light source 25 shown in FIG. 5 has a length substantially equal to a width of the light guide plate 24.

The light guide plate 24 is made of a material having a high refractive index such as polycarbonate, polymethyl methacrylate, and glass. One of principal planes of the light guide plate 24 is formed in a flat light outgoing plane 26 for outputting the light. Many fine deflection patterns 27 are formed in the plane (pattern surface) facing the light outgoing plane 26 of the light guide plate 24. In the first embodiment, the deflection pattern 27 has a stripe shape extending in parallel with the lengthwise direction of the light source 25, and the deflection patterns 27 are arranged along the direction orthogonal to the lengthwise direction of the light source 25. The deflection pattern 27 includes an inclined plane 27a located on the light source side and a re-incident plane 27b which is of a substantially vertical plane, and the deflection pattern 27 is formed by a recess of which a cross section perpendicular to the lengthwise direction of the deflection pattern 27 has a substantially right-angled triangle. A direction perpendicular to the light outgoing plane 26 is set at a z-axis direction, a direction parallel to the lengthwise direction of the light source 25 is set at an x-axis direction, and a direction orthogonal to both the z-axis direction and the x-axis direction is set at a y-axis direction.

As shown in FIG. 6, the light emitted from the light source 25 is incident into the light guide plate 24 from the light incident plane 28, and the light spreads in the whole of the light guide plate 24 by repeating the total reflection at the light outgoing plane 26 and the opposite surface thereof. In the light propagating through the light guide plate 24, the incident angle to the light outgoing plane 26 is decreased in each time in which the light is reflected by the inclined plane 27a, and the light having the incident angle smaller than a critical angle of the total reflection is outputted from the light outgoing plane 26 toward the semi-transmissive liquid crystal panel 23. In the first embodiment, because the light is outputted from the light outgoing plane 26 in a zy plane, an angle formed between a normal N perpendicular to the light outgoing plane 26 and a direction (hereinafter referred to as peak brightness direction) in which the brightness of the light outputted from the light outgoing plane 26 is maximized is set at the outgoing peak angle θ. The outgoing peak angle θ can be adjusted by the tilt angle of the inclined plane 27a or the like.

In the semi-transmissive liquid crystal panel 23, a liquid crystal layer 31 is sealed by sandwiching the liquid crystal layer 31 between glass substrates 29 and 30. A transparent electrode, a color filter 32, and the like are formed in an inner surface of the glass substrate 29 located on a near side of the reversible light 22. TFT, a pixel electrode, and a black matrix, and the like are formed in the inner surface of the glass substrate 30 located on a far side of the reversible light 22. Many pixels are formed in the semi-transmissive liquid crystal panel 23. Reflecting electrodes 33 formed by a metal thin film are provided at constant pitches in the inner surface of the glass substrate 30, a reflecting region 34 covered with the reflecting electrode 33 is formed in one half of each pixel, and a transmission region 35 in which the reflecting electrode 33 does not exist is formed in the other half of each pixel.

As shown in FIG. 6, when the light outputted from the light outgoing plane 26 of the reversible light 22 is incident into the semi-transmissive liquid crystal panel 23, the light incident to the reflecting region 34 is reflected from reflecting electrode 33 to return to the original direction, the light is transmitted through the light guide plate 24, and the light is observed on the front light side. On the other hand, the light incident to the transmission region 35 is transmitted through the glass substrate 30, and the light is observed on the back light side. Therefore, in the double-side display device 21, when each pixel of the semi-transmissive liquid crystal panel 23 is on-and-off controlled to generate the image, the image can be observed in the whole of the display surface on the front light side, and the image can also be observed in the whole of the display surface on the back light side at the same time.

At this point, the condition that the good-look image can be observed on both the sides will be considered for the double-side display device 21 in which the double-side display can be performed in the whole of the display surface (pixel region) as described above. FIG. 7 shows an evaluation result of image quality by a simulation on the front light side (expressed by FL side in FIG. 7) and the back light side (expressed by BL side in FIG. 7) when characteristics of the light guide plate 24 are changed on the assumption that the general semi-transmissive liquid crystal panel 23 (expressed by LCD side in FIG. 7) is used. Transmittance is set at 6.5% and reflectance is set at 6.5% (generally reflectance ranges from 10 to 13% in the reflection type liquid crystal panel) on the assumption that the semi-transmissive liquid crystal panel 23 is a general TFT semi-transmissive liquid crystal panel. In each case, peak brightness (brightness in the peak brightness direction) of the light outputted from the light outgoing plane 26 of the reversible light 22 is set at 3000 cd/m2. As shown in FIG. 7, the outgoing peak angle θ is changed from 6° to 15° in samples 1 to 10. At this point, in the samples 1 to 10, a ratio (hereinafter referred to as normal direction brightness ratio, expressed by N/P brightness ratio in FIG. 7) of the brightness in the direction normal perpendicular to the light outgoing plane 26 to the peak brightness ranges from 55% to 14%.

The evaluation results of the peak brightness (hereinafter sometimes referred to as back light side peak brightness) of the light transmitted onto the back light side and the brightness (hereinafter sometimes referred to as back light side front face brightness) in the normal direction perpendicular to the light outgoing plane 26 are shown in FIG. 7 on the above conditions in the double-side display device of the samples 1 to 10. FIG. 7 also shows the evaluation results of the brightness (noise brightness) of the noise light in the normal direction on the front light side, the brightness (signal brightness) of the signal light in the normal direction, and the contrast ratio thereof. The brightness on the front light side is evaluated in consideration of diffusion effect (10°) of the reflected light.

Figure 8:
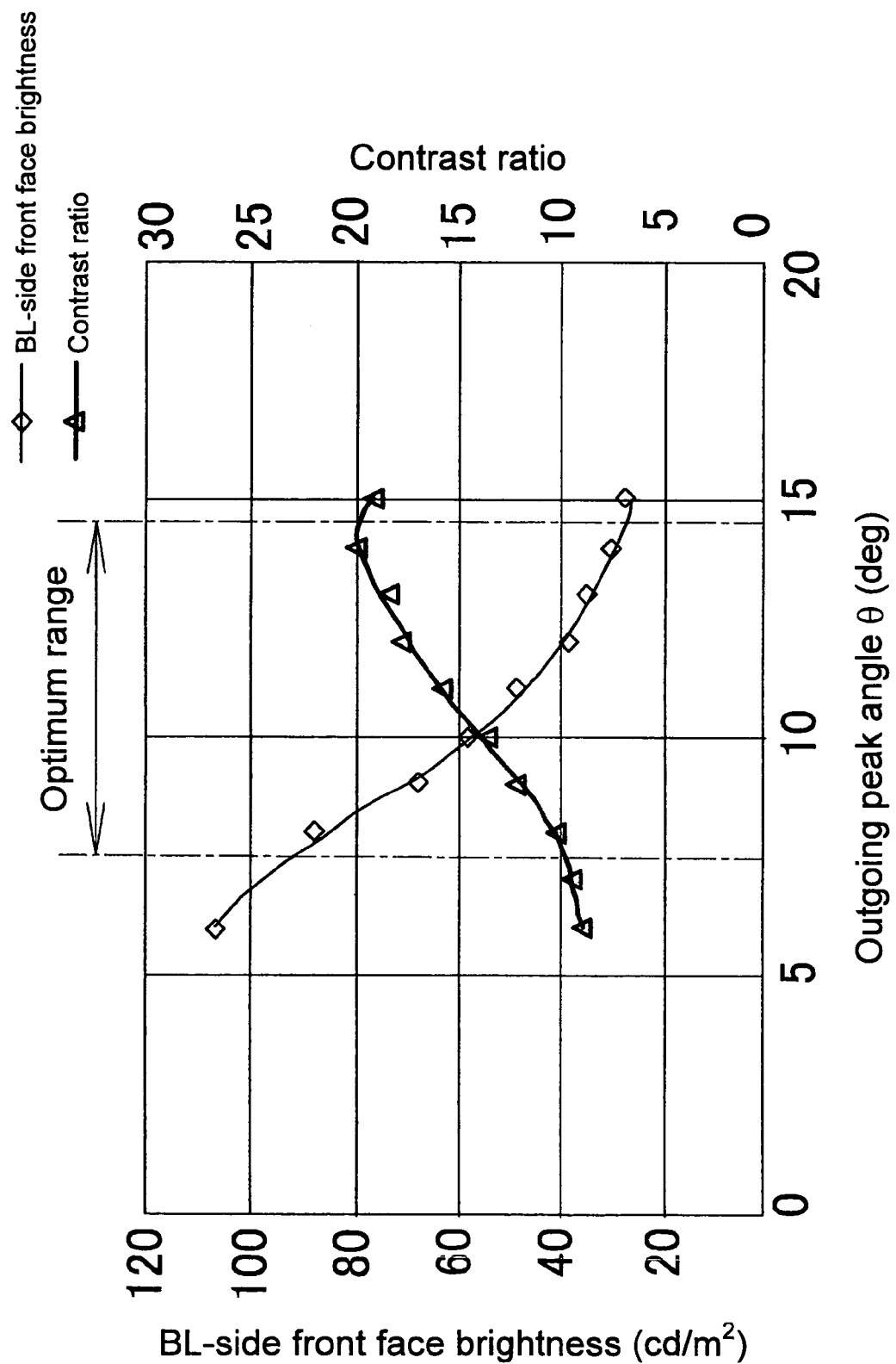
FIG. 8 shows the front face brightness on the back light side and a change in contrast ratio on the front light side based on numerical values of FIG. 7 for a change in outgoing peak angle θ of the light outputted from a light outgoing plane.

FIG. 8 shows the front face brightness on the back light side and the change in contrast ratio on the front light side based on the numerical values of FIG. 7 for the change in outgoing peak angle θ of the light outputted from the light outgoing plane.

The conditions of the optimum double-side display device in which the good-look image is obtained are as follows.
light guide plate:
  peak brightness 3000 cd/m²
  outgoing peak angle; 10°
  view angle; ±14°
semi-transmissive liquid crystal panel:
  transmittance; 6.5%
  reflectance; 6.5%
back light side:
  back light side peak brightness; 195 cd/m²
  back light side front face brightness; 60 cd/m²
front light side:
  contrast ratio; 14

Accordingly, the sample 5 is most preferable in the samples shown in FIG. 7, and the optimum double-side display device having the good look exists in a certain range of the samples including the sample 5. However, actually the image look is worsened on the front light side when the contrast ratio is lower than 10, and a screen is darkened to worsen the image look on the back light side when the back light side front face brightness is lower than 15% of the back light side peak brightness. Therefore, in the samples shown in FIG. 7, the samples 3 to 5 are the optimum sample. FIG. 8 shows the optimum range which ranges from 8° to 14° in terms of the outgoing peak angle θ. The optimum range ranges from 15% to 45% in terms of the normal direction brightness ratio on the back light side.

As can be seen from the simulation results, the good-look image can be obtained on the both sides of the double-side display device by setting the normal direction brightness on the back light side/peak brightness (normal direction brightness ratio) in the range of 15% to 45%. Particularly the contrast ratio on the front light side and the front face brightness on the back light side can be improved.

Figure 9:
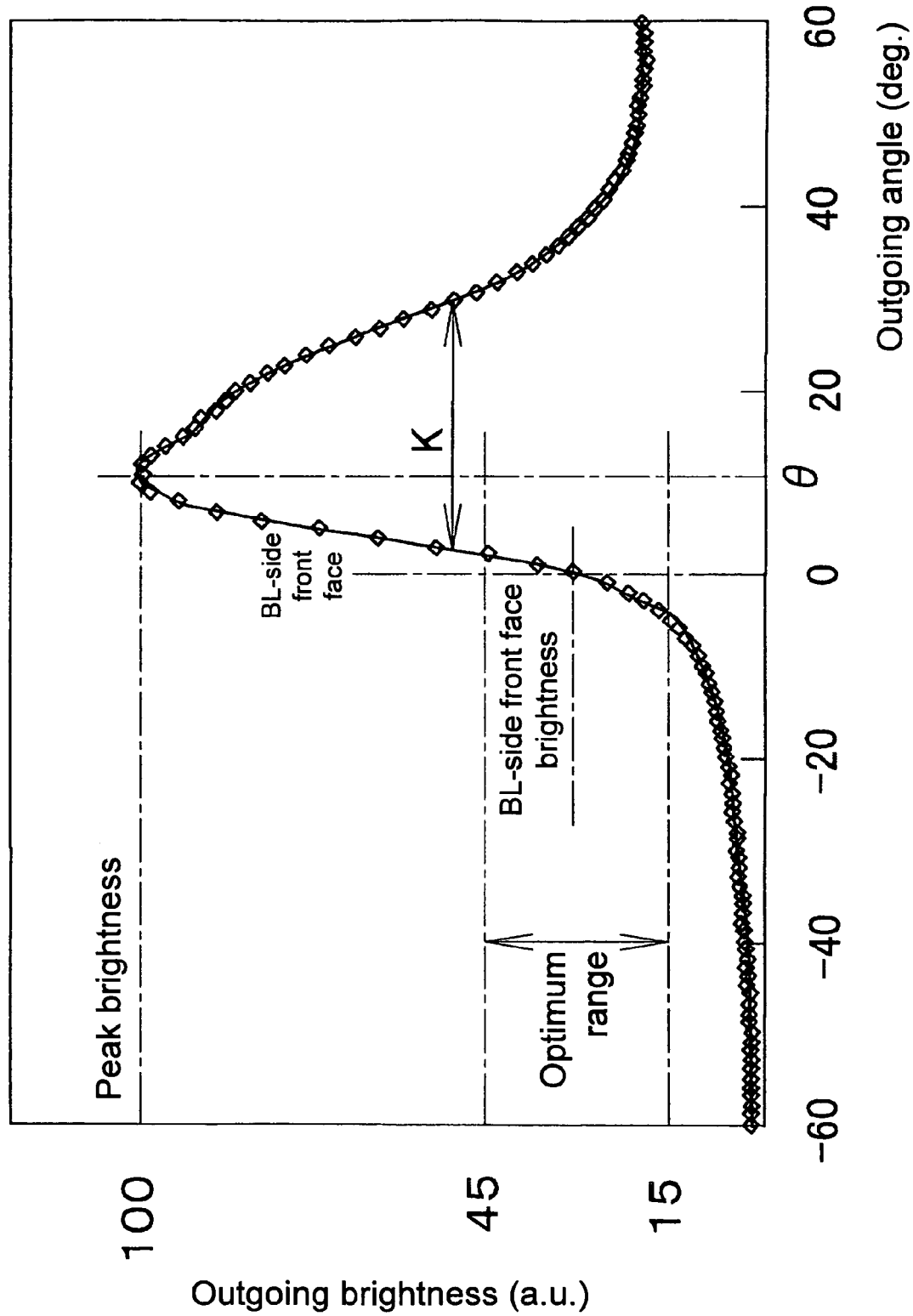
FIG. 9 shows directivity of light which is transmitted through a semi-transmissive liquid crystal panel and outputted to the back light side.

FIG. 9 shows directivity (view angle characteristics) of light which is transmitted through the semi-transmissive liquid crystal panel 23 and outputted to the back light side. A horizontal axis of FIG. 9 expresses the outgoing angle of the light which is transmitted through the semi-transmissive liquid crystal panel 23 and outputted to the back light side. The outgoing angle is measured from the normal N perpendicular to the light outgoing plane 26, and the outgoing angle takes a positive value on the far side of the light source and takes a negative value on the near side of the light source. A vertical axis of FIG. 9 expresses the brightness of the outgoing light in each outgoing direction, and the peak brightness of the outgoing light is set at "100". Since the semi-transmissive liquid crystal panel 23 is optically a parallel plate, it is also thought that the horizontal axis of FIG. 9 expresses the outgoing angle of the light outputted from the light outgoing plane 26. Accordingly, the outgoing angle corresponding to the peak brightness of FIG. 9 is the outgoing peak angle θ, the outgoing brightness in which the outgoing angle is 0° is the back light side front face brightness. Since the peak brightness is set at "100", the value of the outgoing brightness in which the outgoing angle is 0° expresses the normal direction brightness ratio. When the outgoing brightness (back light side front face brightness) exists in the optimum range while the outgoing angle is 0° in the directivity drawing, the double-side display device 21 having the good-look image on the both sides can be obtained. Therefore, when the directivity of the light outputted to the back light side from the semi-transmissive liquid crystal panel 23 is determined by an experiment or by the simulation, the optimum design of the double-side display device 21 can easily be performed using the directivity drawing shown in FIG. 9.

In the light outputted from the light outgoing plane 26, when the outgoing peak angle e is changed while peak intensity is kept constant, the curve expressing the directivity is moved in parallel with the horizontal axis in FIG. 9, and the back light side front face brightness is changed in the outgoing angle of 0°. Accordingly, the curve of FIG. 9 is moved in parallel with the horizontal axis, the value of the outgoing peak angle θ is determined when the curve passes through a point where the outgoing angle is 0° and the outgoing brightness is 15, and the value of the outgoing peak angle θ is determined when the curve passes through a point where the outgoing angle is 0° and the outgoing brightness is 45. Therefore, the optimum range of the outgoing peak angle θ can be learned. In the directivity shown in FIG. 9, the optimum range of the outgoing peak angle θ ranges from 8° to 14°.

Figure 10:
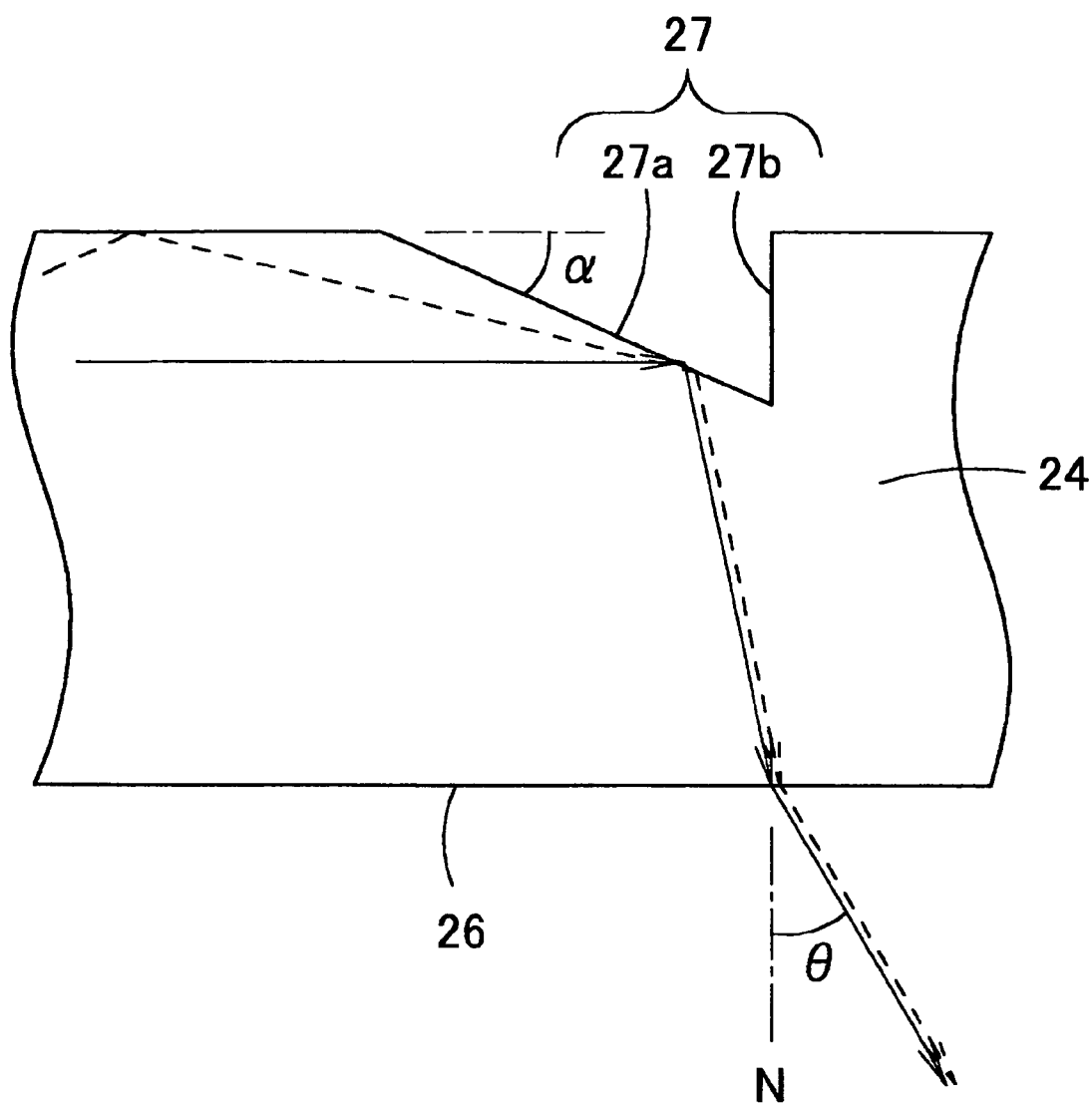
FIG. 10 shows a relationship between a tilt angle α and the outgoing peak angle θ of a deflection pattern.

When the outgoing peak angle θ is determined, a tilt angle α of the inclined plane 27a of the deflection pattern 27 of the deflection pattern 27 shown in FIG. 10 can be determined so as to satisfy the following expression 1 or 2.

$$|\alpha - 45°| \leq [\arc\sin(\sin\theta/n)]/2 \qquad \text{(expression 1)}$$

or $$45° - [\arc\sin(\sin\theta/n)]/2 \leq \alpha \leq 45° + [\arc\sin(\sin\theta/n)]/2 \qquad \text{(expression 2)}$$

where θ is an outgoing peak angle and n is a refractive index of a light guide plate.

As shown in FIG. 10, in order that the light incident to the deflection pattern 27 from the direction parallel to the surface of the light guide plate 24 is totally reflected from the inclined plane 27a and outputted from the light outgoing plane 26 toward the direction of the outgoing peak angle θ it is necessary that the tilt angle α of the inclined plane 27a satisfies the following expression 3.

$$\alpha = 45° - [\arcsin(\sin\theta/n)]/2 \quad \text{(expression 3)}$$

Because it can be thought that the light incident to the inclined plane 27a is incident to the inclined plane 27a from above as shown by the broken-line arrow of FIG. 10, in order to output the light at the outgoing peak angle θ it is necessary that the tilt angle α is larger than the value of the expression 3. That is, the following expression is obtained.

$$45° - [\arcsin(\sin\theta/n)]/2 \leq \alpha$$

This is the in equation on the left side of the expression 2.

For example, assuming that the refractive index is n=1.5 and the outgoing peak angle is θ=10° in the light guide plate 24, the range of the tilt angle α of the inclined plane 27a can be determined as follows from the expression 2.

$$41.7° \leq \alpha \leq 48.3°$$

Figure 11:
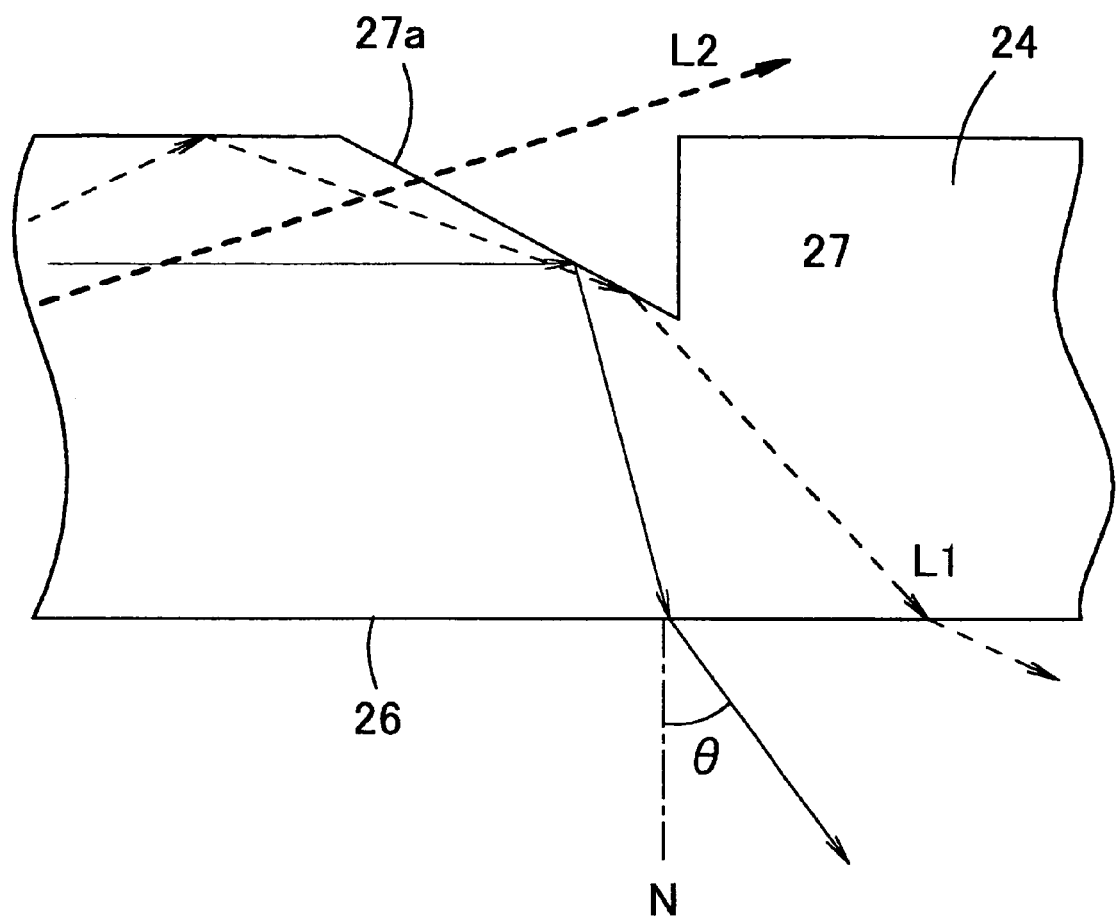
FIG. 11 shows a state in which a bright line is generated in the double-side display device.

Even if the design is performed such that the peak brightness direction is aligned with the outgoing peak angle θ as shown by a solid-line arrow of FIG. 11, as shown by a thin broken-line arrow of FIG. 11, light L1 which is totally reflected from the pattern surface of the light guide plate 24 and incident to the inclined plane 27a from above is outputted with an angle larger than the outgoing peak angle θ. Because the light L1 is not incident to the semi-transmissive liquid crystal panel 23 but outputted toward the oblique direction, the light L1 becomes the bright line on the back light side. As shown by a thick broken-line arrow of FIG. 11, because light L2 incident to the inclined plane 27a from below is transmitted through the inclined plane 27a and outputted to the front light side, the bright line is also generated on the front light side.

Figure 12:
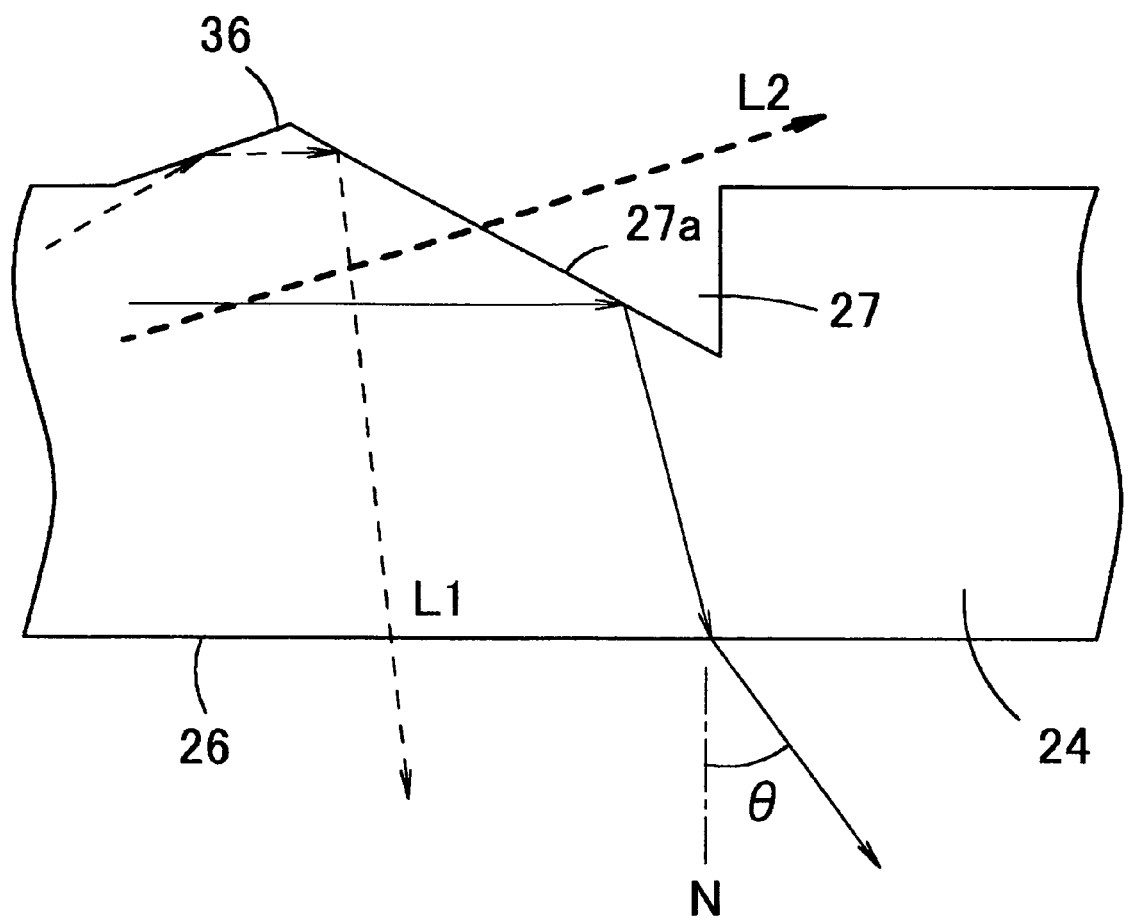
FIG. 12 shows a sectional view of the deflection pattern having a triangle projection on a light source side.

In order to suppress the bright line on the back light side, it is necessary that a projection 36 having a triangular shape in section be provided adjacent to the light source side of the deflection pattern 27 as shown in FIG. 12. When the projection 36 is provided on the light source side, the light L1 is totally reflected twice from the projection 36 and then the light L1 is outputted from the light outgoing plane 26. Because the light L1 substantially vertically outputted from the light outgoing plane 26 is incident to the semi-transmissive liquid crystal panel 23, the bright line on the back light side can be decreased to improve the brightness.

Figure 13:
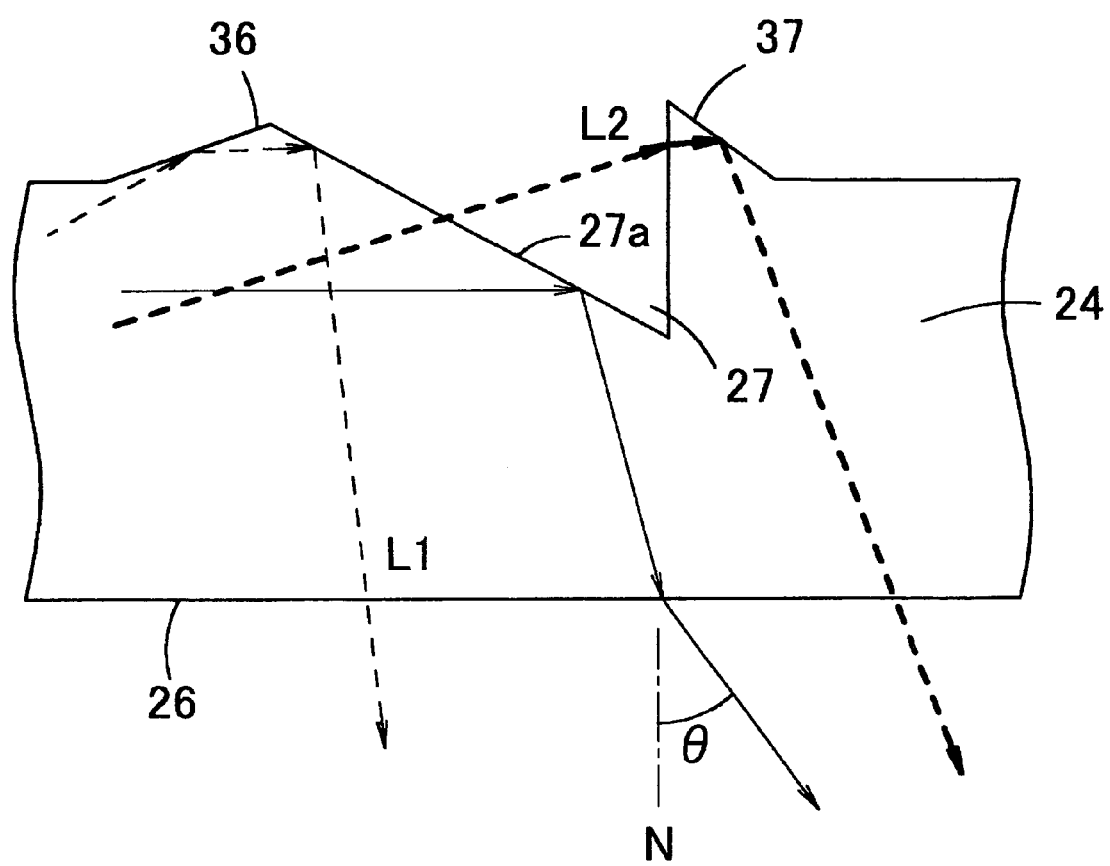
FIG. 13 shows a sectional view of the deflection pattern having a right-angled-triangle projection on an opposite side to the light source.

In order to suppress the bright line on the front light side, it is necessary that a projection 37 having a right-angled triangular shape in section be provided adjacent to the opposite side to the light source of the deflection pattern 27 as shown in FIG. 13. When the projection 37 is provided on the opposite side to light source, the light L2 which leaks from the inclined plane 27a is re-incident to the projection 37 and totally reflected from the inclined plane of the projection 37. Because the light L2 substantially vertically outputted from the light outgoing plane 26 is incident to the semi-transmissive liquid crystal panel 23, the bright line on the front light side can be decreased to improve the brightness.

The double-side display device 21 of the invention includes the one reversible light 22 and the one semi-transmissive liquid crystal panel 23, so that the number of components of the double-side display device can be decreased. Therefore, the double-side display device 21 can inexpensively be provided, and the low profile and the weight reduction can also be achieved in the double-side display device 21. The front face brightness on the back light side can be improved while the contrast on the front light side can be improved, and the good-look image can be obtained on both the front light side and the back light side. Further, when compared with a region splitting type double-side display device described later in a second embodiment, the image can be displayed on the whole surface on both the front light side and the back light side in the double-side display device 21 of the first embodiment. Therefore, when an area of the display screen is equal to each other, the double-sided is play device 21 can be miniaturized.

In the first embodiment, the linear light source is used as the light source 25, the striped fine deflection patterns 27 having the substantially right-angled triangular shape in section are formed in the pattern surface. The structure of the double-side display device is not limited to the first embodiment. For example, in a double-side display device shown in FIG. 14, a so-called point light source in which LED is used for the light source 25 is utilized. The point light source shall means a light source in which the length of the light source is sufficiently short compared with the width of the light guide plate 24. Although the one point light source is arranged in FIG. 14, the plural point light sources may be used. The fine deflection patterns 27 are provided in a concentric manner about the light source 25 on an upper surface (pattern surface) of the light guide plate 24. In the deflection pattern 27, the substantially right-angled triangular cross section orthogonal to the lengthwise direction of the deflection pattern 27 is relatively short, the surface on the near side of the light source 25 is formed as the inclined plane, and the surface on the far side of the light source 25 is formed as the re-incident plane which is substantially perpendicular to the light outgoing plane 26. The deflection patterns 27 are arranged such that the lengthwise direction of the deflection pattern 27 is substantially orthogonal to the direction in which the light source 25 and a point on the deflection pattern 27 are connected to each other, when the deflection pattern 27 is viewed from the direction perpendicular to the light outgoing plane 26. The deflection patterns 27 are also discretely arranged along a circumferential direction.

Figure 14:
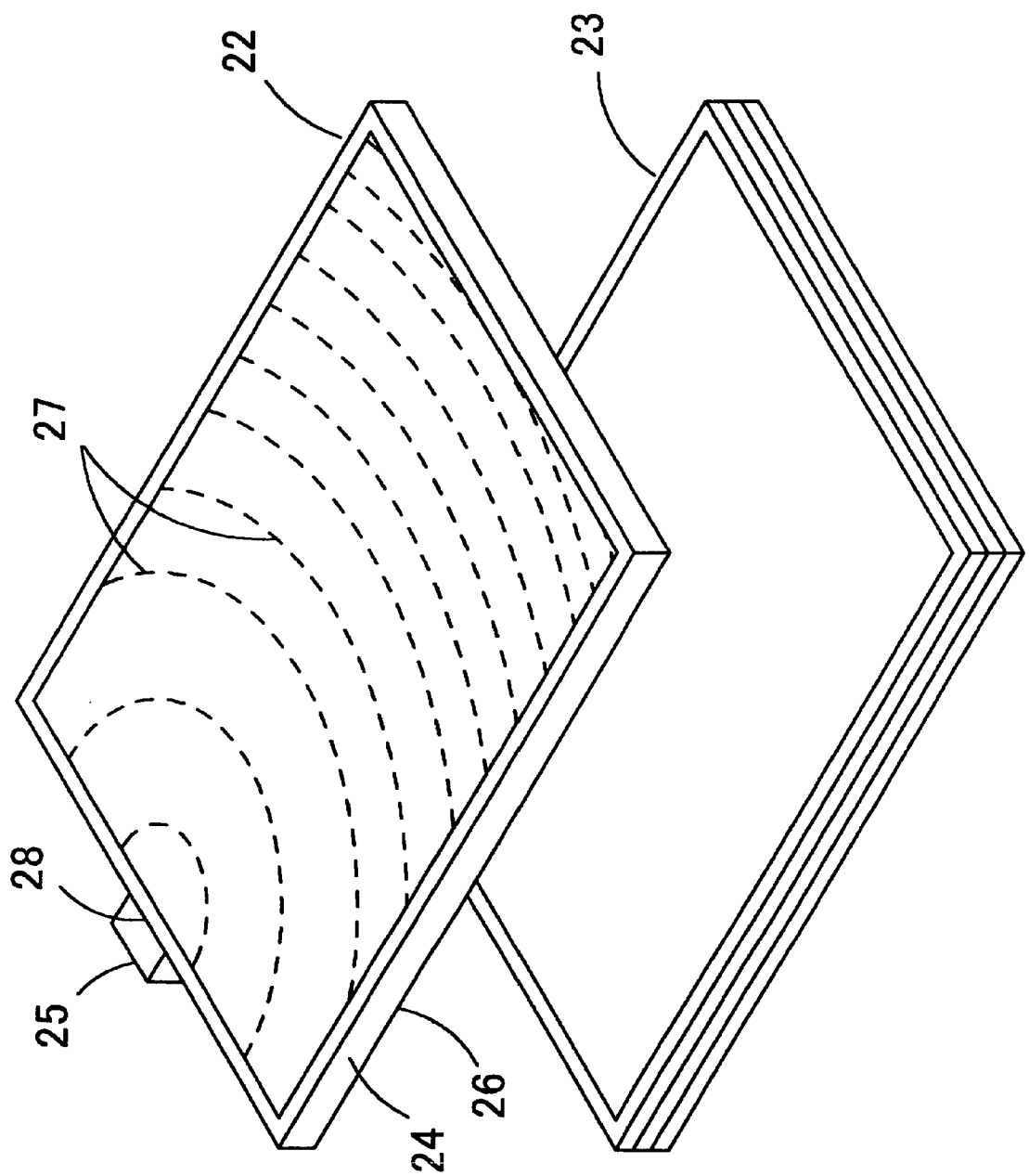
FIG. 14 shows an exploded sectional view of a modification of the first embodiment.

Even in the double-side display device having the structure of FIG. 14, when the brightness of the light outputted from the light outgoing plane 26 in the direction perpendicular to the light outgoing plane 26 of the light guide plate 24 is set in the range of 15% to 45% of the peak brightness of the light outputted from the light outgoing plane 26, i.e., when the normal direction brightness ratio is set in the range of 15% to 45%, the double-side display device which has the good contrast on the front light side and the good front face brightness on the back light side and also has the good looks on the both sides can be produced.

It is desirable that a transparent resin material such as polycarbonate and polymethyl methacrylate be used to produce the light guide plate 24 by an injection molding method or a molding method with a stamper. For example, a pair of dies is used in the case of the injection molding method. The pair of dies includes the die in which a reverse shape pattern of the deflection pattern 27 is formed and the die having a mirror-polished surface of an anti reflective structure. The molten resin material is injected between the pair of dies to fill a cavity with the resin material, the molded object is cooled to harden the resin material, and then the dies are opened to discharge the molded object from the dies. When the injection molding is adopted, the light guide plate can inexpensively be produced in large quantities. In this case, when the re-incident plane of the deflection pattern having the substantially right-angled triangular shape in section is slightly inclined from the light outgoing plane, a releasing property between the light guide plate and the die can be improved.

SECOND EMBODIMENT

Figure 15:
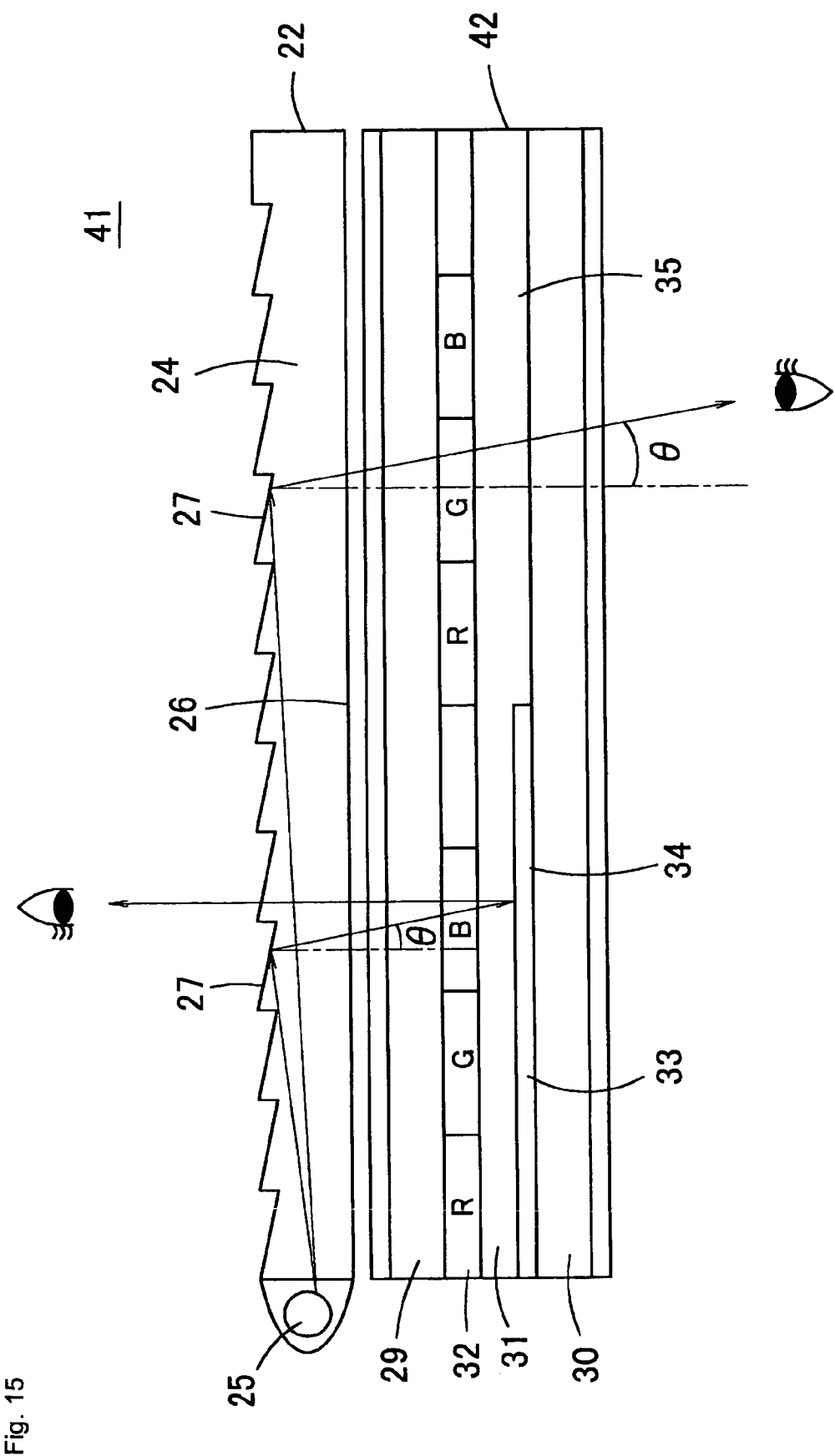
FIG. 15 shows a schematic sectional view of a structure of a double-side display device according to a second embodiment of the invention.

FIG. 15 is a schematic sectional view showing a structure of a double-side display device 41 according to a second embodiment of the invention. Although the reversible light 22 used in the double-side display device 41 has the same structure as the reversible light 22 of the first embodiment, as described later, the reversible light 22 of the second embodiment differs from the reversible light 22 of the first embodiment in the directivity of the light outputted from the light outgoing plane 26. The linear light source and the stripe deflection pattern show in FIG. 5 may be used as the light source 25 and the deflection pattern 27 respectively, or the point light source and the concentric deflection pattern shown in FIG. 14 may be used as light source 25 and the deflection pattern 27 respectively.

A semi-transmissive liquid crystal panel 42 of the second embodiment differs from the semi-transmissive liquid crystal panel 23 of the first embodiment in that the reflecting region 34 and the transmission region 35 are provided piecewise. That is, in the semi-transmissive liquid crystal panel 42, the reflecting electrode 33 is made to form the reflecting region 34 in a half of the semi-transmissive liquid crystal panel 42, and the transmission region 35 is formed without making the reflecting electrode 33 in the other half of the semi-transmissive liquid crystal panel 42.

When the light is outputted from the light outgoing plane 26 of the reversible light 22, in the reflecting region 34, the light incident into the semi-transmissive liquid crystal panel 42 is reflected from the reflecting electrode 33, and the light is transmitted through the light guide plate 24 and outputted to the front light side. On the other hand, in the transmission region 35, the light incident into the semi-transmissive liquid crystal panel 42 is transmitted through the glass substrate 30 and outputted to the back light side. When the double-side display device 41 is viewed from the front light side, the image can be seen only through a half (reflecting region 34) of the double-side display device 41. When the double-side display device 41 is viewed from the back light side, the image can be seen only through the other half (transmission region 35) of the double-side display device 41. Therefore, in the double-side display device 41, the front light side differs from the back light side in the display region.

Similarly to the first embodiment, the condition that the good-look image can be observed on both the sides will be considered for the double-side display device 41. FIG. 16 shows an evaluation result of the image quality by the simulation on the front light side and the back light side when the characteristics of the light guide plate 24 are changed on the assumption that the general semi-transmissive liquid crystal panel 42 (expressed by LCD in FIG. 16) is used. The transmittance is set at 6.5% and the reflectance is set at 13.0% on the assumption that the semi-transmissive liquid crystal panel 42 is a reflection/semi-transmissive STN type liquid crystal panel in which the incident light is reflected on the one hand and the incident light is semi-transmitted on the other. In each case, the peak brightness (brightness in the peak brightness direction) of the light outputted from the light outgoing plane 26 of the reversible light 22 is set at 3000 cd/m2. As shown in FIG. 16, the outgoing peak angle θ is changed from 3° to 15° in samples 11 to 23. At this point, in the samples 11 to 23, the normal direction brightness ratio ranges from 80% to 14%.

The evaluation results of the back light side peak brightness and the back light side front face brightness are shown in FIG. 16 on the above conditions in the double-side display device 41 of the samples 11 to 23. FIG. 16 also shows the evaluation results of the noise brightness in the normal direction on the front light side, the signal brightness of the signal light in the normal direction, and the contrast ratio thereof. The contrast ratio on the front light side is evaluated in consideration of the contrast (20:1) of the semi-transmissive liquid crystal panel 42 of itself.

Figure 17:
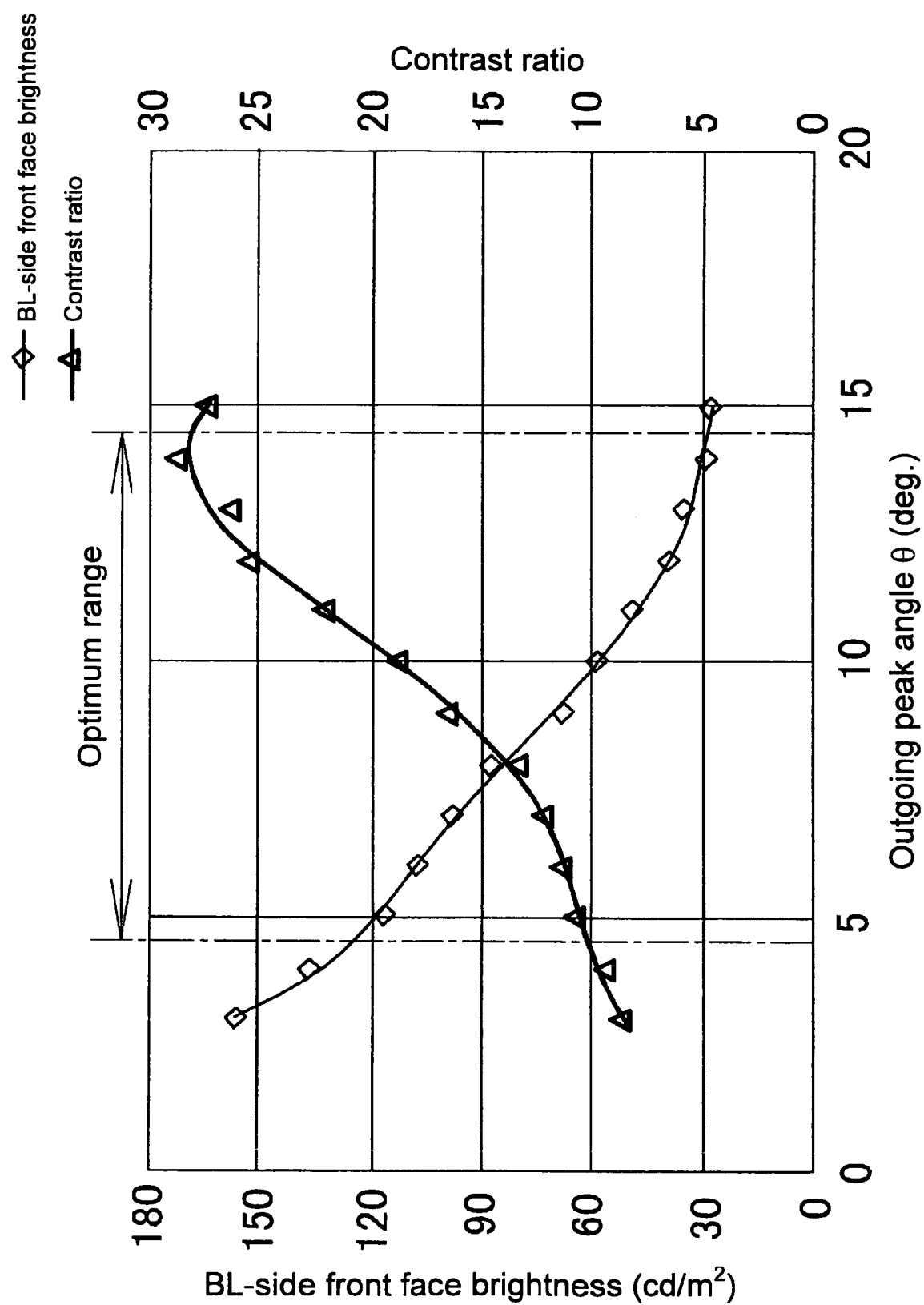
FIG. 17 shows the front face brightness on the back light side and the change in contrast ratio on the front light side for the change in outgoing peak angle θ of the light outputted from the light outgoing plane.

FIG. 17 shows the front face brightness on the back light side and the change in contrast ratio on the front light side based on the numerical values of FIG. 16 for the change in outgoing peak angle θ of the light outputted from the light outgoing plane 26.

The conditions of the optimum double-side display device in which the good-look image is obtained are as follows.
light guide plate:
   peak brightness 3000 cd/m$^2$
   outgoing peak angle; 9°
   view angle; ±14°
semi-transmissive liquid crystal panel:
   transmittance; 6.5%
   reflectance; 13.0%
back light side:
   back light side peak brightness; 195 cd/m$^2$
   back light side front face brightness; 68 cd/m$^2$
front light side:
   contrast ratio; 15.4

Accordingly, the sample 17 is most preferable in the samples shown in FIG. 16, and the optimum double-side display device having the good look exists in a certain range of the samples including the sample 17. However, actually the image look is worsened on the front light side when the contrast ratio is lower than 10, and a screen is darkened to worsen the image look on the back light side when the back light side front face brightness is lower than 15% of the back light side peak brightness. Therefore, in the samples shown in FIG. 16, the samples 13 to 22 are the optimum sample. FIG. 17 shows the optimum range which ranges from 5° to 14° in terms of the outgoing peak angle θ. The optimum range ranges from 15% to 60% in terms of the normal direction brightness ratio on the back light side.

As can be seen from the simulation results, the good-look image can be obtained on the both sides of the double-side display device 41 by setting the normal direction brightness ratio (N/P brightness ratio) in the range of 15% to 60%. Particularly the contrast ratio on the front light side and the front face brightness on the back light side can be improved.

The method of performing the optimum design using the directivity drawing of the light outputted from the light outgoing plane 26 of the semi-transmissive liquid crystal panel 23 or using the directivity drawing of the light transmitted through the semi-transmissive liquid crystal panel 42 is as described in FIG. 9 of the first embodiment, so that the description will not be given in the second embodiment.

In the second embodiment, the region splitting semi-transmissive liquid crystal panel 42 is produced by the reflecting electrode 33 provided in the semi-transmissive liquid crystal panel 42. In addition, structures shown in FIGS. 18 and 19 may be used.

FIGS. 18A, 18B, and 18C are schematic sectional views showing modifications of the region splitting type double-side display device 41 in which a transmitted light type liquid crystal panel 43 is used. In the double-side display devices 41 of FIGS. 18A, 18B, and 18C, the semi-transmissive liquid crystal panel 42 is formed by providing a reflecting sheet 44 only in a part (reflecting region 34) of the inside on the back light side of the transmitted light type liquid crystal panel 43. According to the modifications, the structure of the semi-transmissive liquid crystal panel 42 can be simplified.

For the modification of FIG. 18B, in the region corresponding to the transmission region 35, a diffusion sheet 45 is provided in the surface on the back light side (or the side of semi-transmissive liquid crystal panel) of the reversible light 22. For the modification of FIG. 18C, in the region corresponding to the transmission region 35, the diffusion sheet 45 and two prism sheets 46 and 47 are superposed in the surface on the back light side (or the side of semi-transmissive liquid crystal panel) of the reversible light 22. In the prism sheets 46 and 47, prisms having the triangular shape in section are arranged in parallel, and the prism sheets 46 and 47 are superposed on each other such that the prism arrangement directions are orthogonal to each other. The prism sheets 46 and 47 have the functions of aligning the light beams outputted from the double-side display device 41 to the back light side (or the side of the semi-transmissive liquid crystal panel) with one another in the direction perpendicular to the double-side display device 41.

In a modification shown in FIG. 19A, in order to diffuse the light, a diffusion treatment is performed in the reflecting electrode 33 provided inside the reflecting region 34 in the semi-transmissive liquid crystal panel 42. In a modification shown in FIG. 19B, in order to diffuse the light, the diffusion treatment is performed in the reflecting sheet 44 provided on the back light side of transmitted light type liquid crystal panel 43. Further, for the modifications of FIGS. 19A and 19B, in the surface on the front light side of the reversible light 22, a reflector plate 48 is arranged in the region facing the transmission region 35. Therefore, the light which leaks from the pattern plane of the light guide plate 24 is reflected by the reflector plate 48 and re-incident into the light guide plate 24, which decreases light loss.

Alternatively, although the drawings are not prepared, the semi-transmissive liquid crystal panel 42 may be divided into regions of the reflecting region and the semi-transmission region, the light may be substantially completely reflected in the reflecting region, and part (for example about 50%) of the incident light may be transmitted while the remaining light (for example, about 50%) may be reflected in the semi-transmission region. The reflecting region can be obtained by providing the reflecting electrode in the whole of the reflecting region. In the semi-transmission region, a half mirror may be used, or the reflecting electrodes may be arranged in the dispersive manner with an interval (the structure similar to the semi-transmissive liquid crystal panel of the first embodiment). In the case of the reflecting region/semi-transmission region type, the image can be seen in the whole region of the reflecting region and the semi-transmission region on the front light side, while the image can be seen only in the semi-transmission region on the back light side.

THIRD EMBODIMENT

Figure 20:
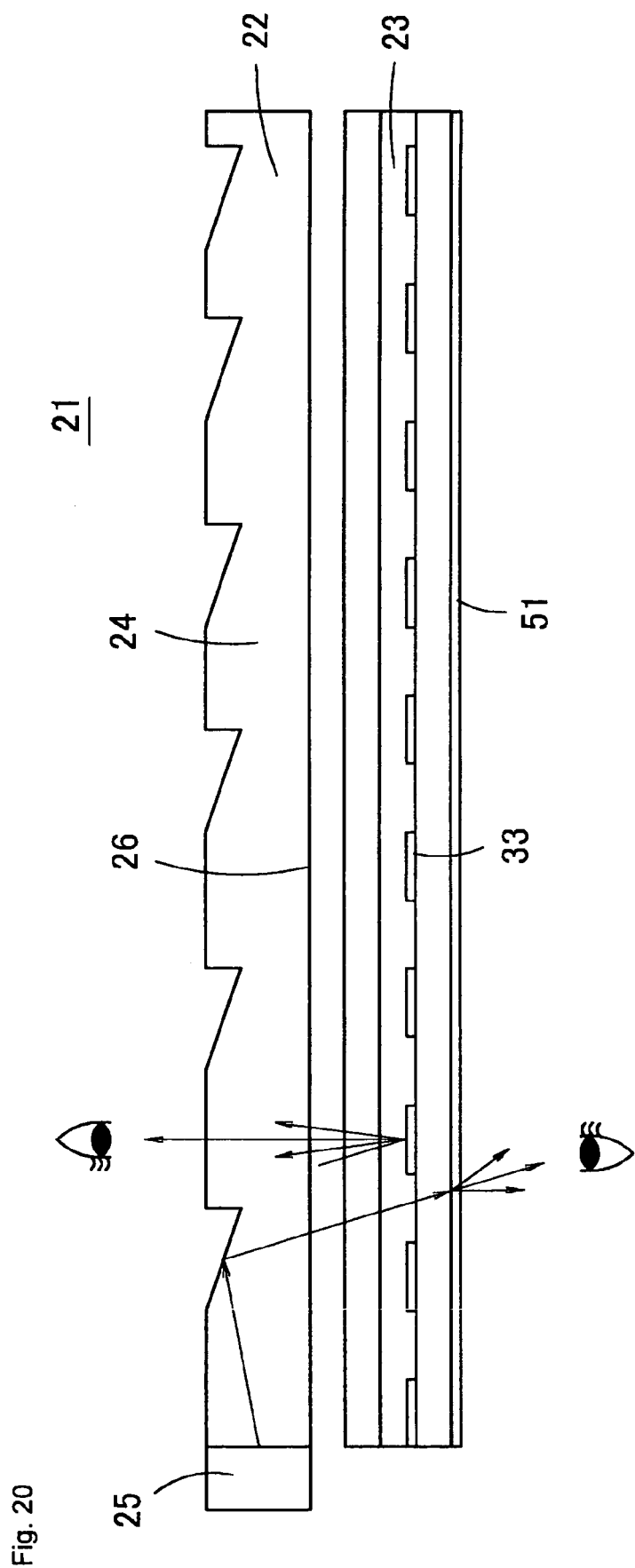
FIG. 20 shows a schematic sectional view of a structure of a double-side display device according to a third embodiment of the invention.

A double-side display device in which the look of the image is further improved based on the double-side display devices of the first and second embodiments will be described below. In the third embodiment, the double-side display device 21 of the first embodiment will be described as an example. However, the double-side display device 41 of the second embodiment may be also used in the third embodiment. In the double-side display device 21, as shown in FIG. 20, a diffusion layer 51 is provided in the plane on the back light side of the semi-transmissive liquid crystal panel 23. For example, the diffusion layer 51 is formed by mixing fine beads in an adhesion layer for bonding the polarization plate to the surface of the semi-transmissive liquid crystal panel 23. The diffusion layer 51 is formed such that a diffusion angle of the diffusion layer 51 is equal to half width at half maximum K/2 (see FIG. 9) of the view angle characteristics of the light outputted from the light outgoing plane 26 of the light guide plate 24. The look of the image can further be improved on the back light side by providing the diffusion layer 51 in the plane on the back light side of the semi-transmissive liquid crystal panel 23.

The reflecting electrode 33 of the semi-transmissive liquid crystal panel 23 has a diffusion effect. For example, a fine corrugated pattern is formed on the surface of the reflecting electrode 33 while having a size sufficiently smaller than the pixel pitch of the semi-transmissive liquid crystal panel 23, which exerts the diffusion effect. The diffusion angle of the reflecting electrode 33 is formed so as to be equal to the half width at half maximum K/2 of the view angle characteristics of the light outputted from the light outgoing plane 26 of the light guide plate 24. The look of the image can further be improved on the front light side by imparting the diffusion effect to the reflecting electrode 33.

FOURTH EMBODIMENT

Figure 21:
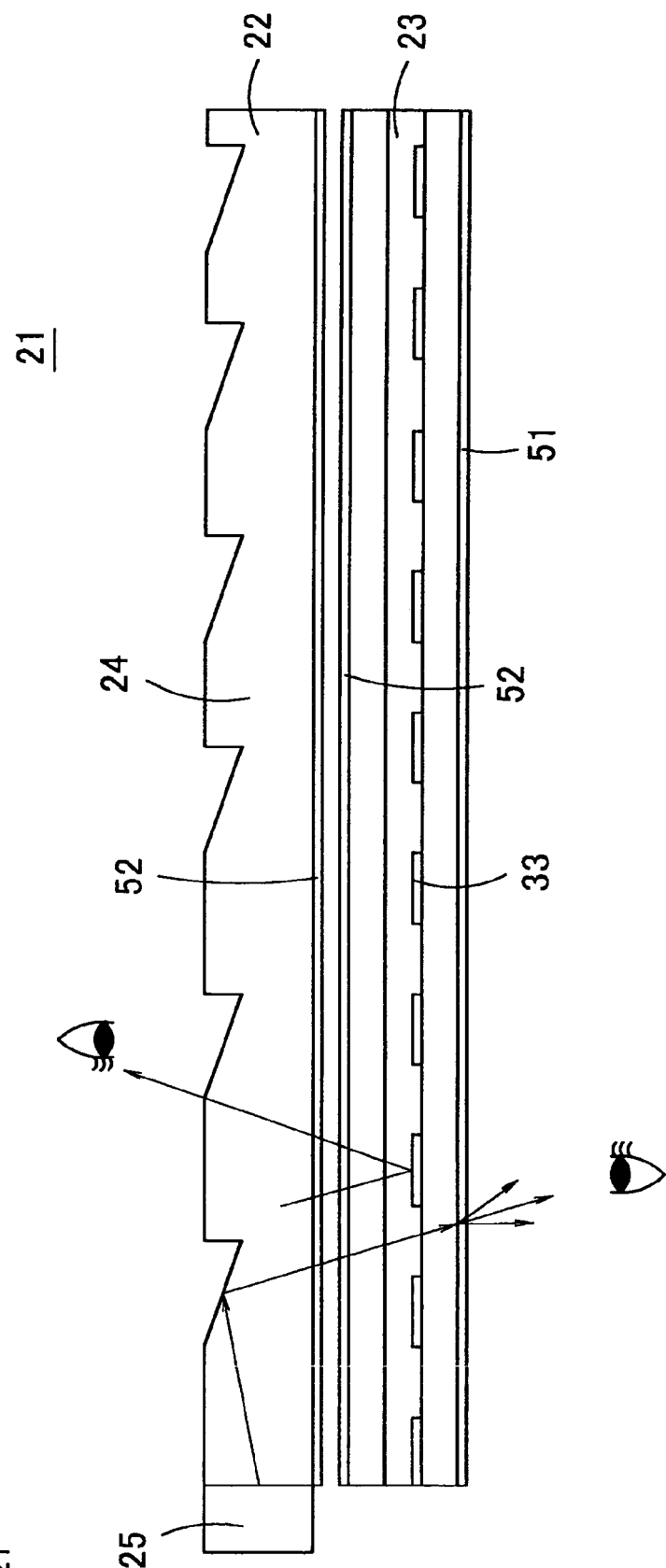
FIG. 21 shows a schematic sectional view of a structure of a double-side display device according to a fourth embodiment of the invention.

For a fourth embodiment shown in FIG. 21, in the double-side display device 21 of the first embodiment (the double-side display device 41 of the second embodiment may be used), an anti reflective coat (AR coat) 52 is deposited by a vapor deposition method, a sputtering method, or the like onto at least one of the light outgoing plane 26 of the light guide plate 24 and the surface on the opposite side to the back light side of the semi-transmissive liquid crystal panel 23. According to the fourth embodiment, specular reflection is suppressed to prevent the generation of the noise light in the light outgoing plane 26 or the surface facing the light outgoing plane 26 of the semi-transmissive liquid crystal panel 23, so that the contrast can be enhanced to improve the image quality on the front light side.

Figure 22:
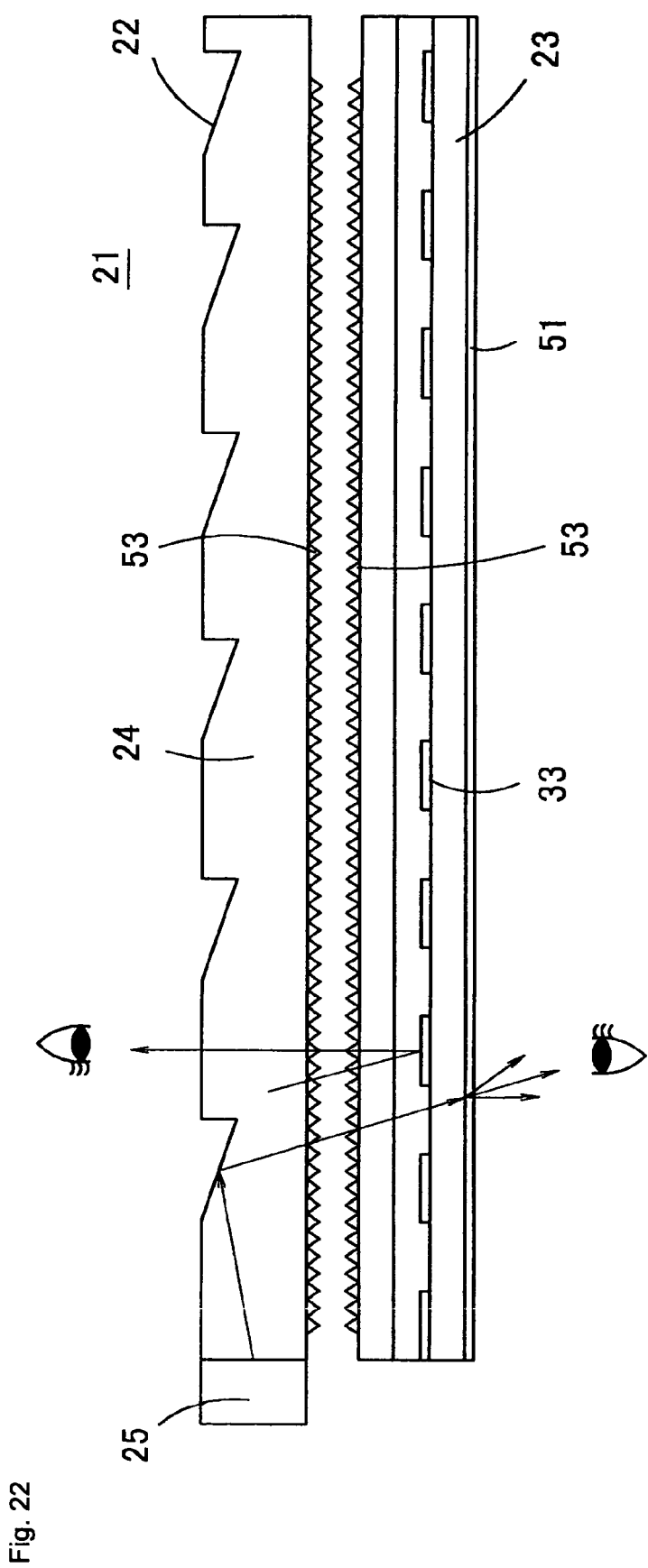
FIG. 22 shows a schematic sectional view of another structure of the double-side display device of the fourth embodiment.

FIG. 22 is a schematic sectional view showing a modification of the double-side display device of the fourth embodiment. In the modification of FIG. 22, an anti reflective structure 53 is formed at least one of the light outgoing plane 26 of the light guide plate 24 and the surface on the opposite side to the back light side of the semi-transmissive liquid crystal panel 23. In the anti reflective structure 53, the fine corrugated pattern having the size smaller than a wavelength of visible light is formed by the injection molding method with the die, a thermal transfer method, or the like in the polarization plate on the light outgoing plane 26 of the light guide plate 24 or the surface of the semi-transmissive liquid crystal panel 23. According to the modification, the specular reflection is suppressed to prevent the generation of the noise light in the light outgoing plane 26 or the surface facing the light outgoing plane 26 of the semi-transmissive liquid crystal panel 23, so that the contrast can be enhanced to improve the image quality on the front light side.

FIFTH EMBODIMENT

FIG. 23A is a schematic sectional view showing a double-side display device 61 according to a fifth embodiment. In the above-described embodiments, it is intended to improve the contrast on the front light side and the front face brightness on the back light side. However, it is necessary to consider orientation of the peak brightness on the back light side depending on the application or the installation status in the apparatus. In the double-side display device 61 of FIG. 23A, the light source 25 is arranged in the upper portion of the light guide plate 24, and the peak brightness direction of the light transmitted onto the back light side is inclined toward the direction in which the light recedes away from the light source.

Figure 24B:
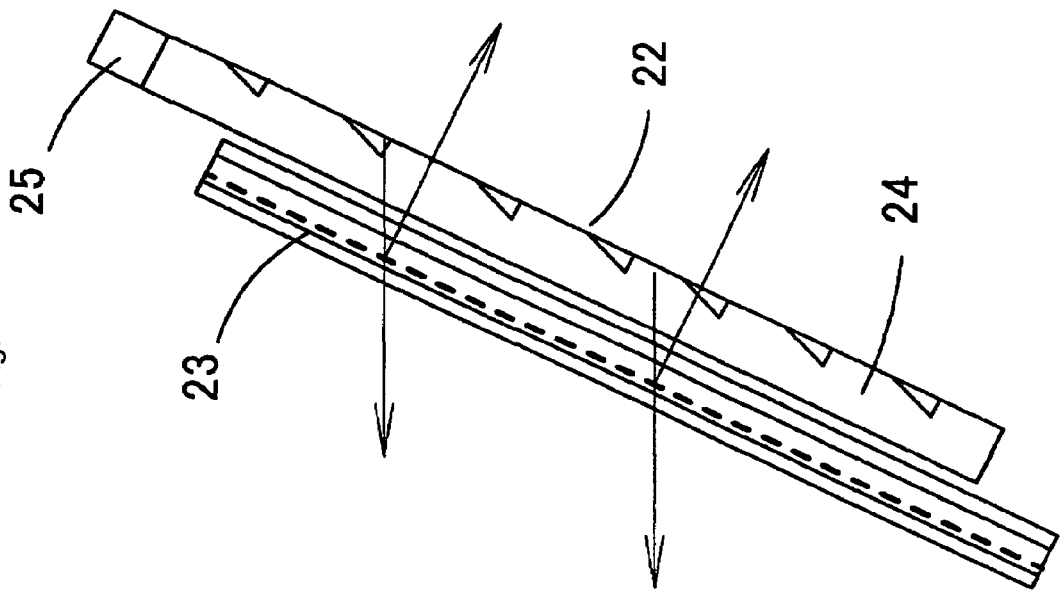
FIGS. 24A and 24B show a perspective view and a sectional view explaining a state of the display unit when the mobile telephone of the fifth embodiment is used, respectively.
Figure 24A:
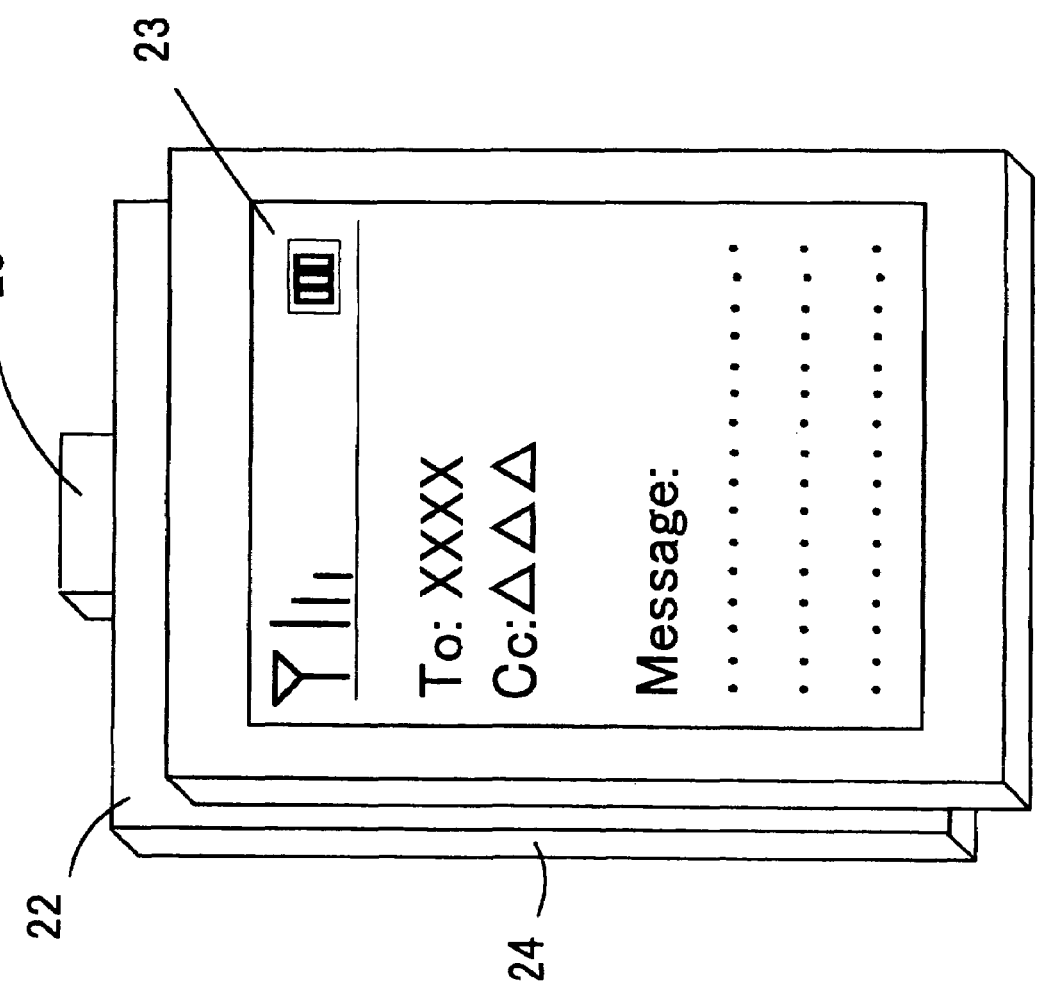

In the double-side display device 61, the light source 25 is arranged so as to be located on the opposite side to a hinge of a mobile telephone 62, and the light source 25 is incorporated into the flip mobile telephone 62 as shown in FIGS. 23B and 23C. However, the light source 25 is incorporated such that the front light side (reversible light side) is orientated toward the outside of the mobile telephone 62 while the back light side (the side of the semi-transmissive liquid crystal panel) is orientated toward the inside of the mobile telephone 62. In the case where the mobile telephone 62 is folded as shown in FIG. 23C, because the display unit is often seen from the front face, the image having the good look and good contrast can be seen from the front face when the front face is set to the front light side. In the case where the mobile telephone 62 is opened as shown in FIG. 23B, because the screen is seen from obliquely below as shown in FIGS. 24A and 24B, the image is seen from the brightness peak direction on the back light side. Therefore, the image can be brightened and the look of the image can be improved on the back light side.

FIG. 25A is a schematic sectional view showing the double-side display device 61 according to a modification of the fifth embodiment. In the double-side display device 61 of FIG. 25A, the peak brightness direction of the light transmitted onto the back light side is obliquely orientated toward the light source side.

Figure 26B:
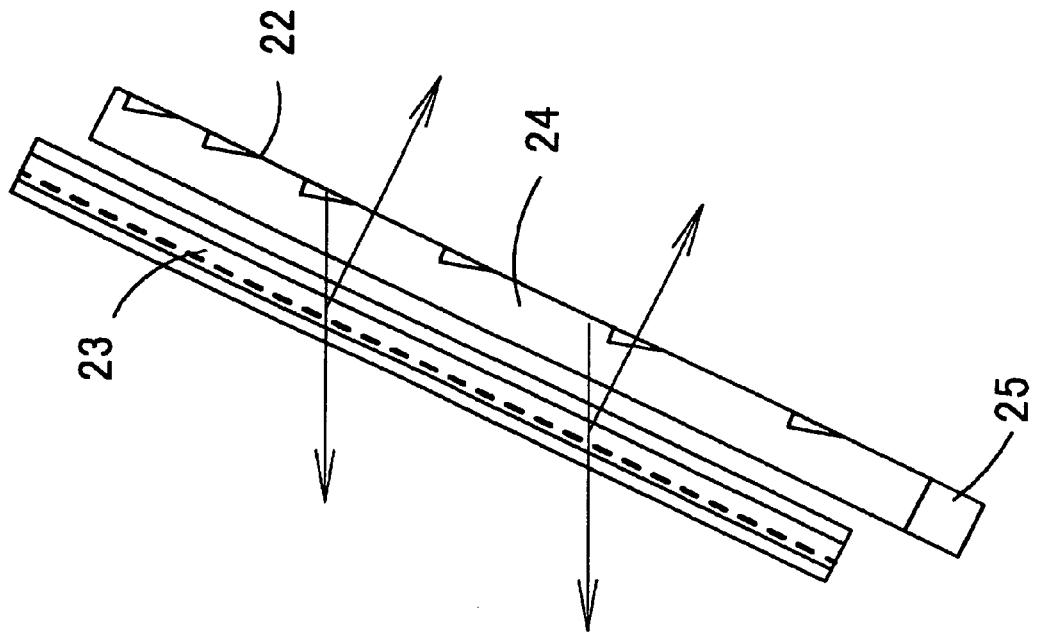
FIGS. 26A and 26B show a perspective view and a sectional view explaining a state of the display unit when the mobile telephone of the modification of the fifth embodiment is used, respectively.
Figure 26A:
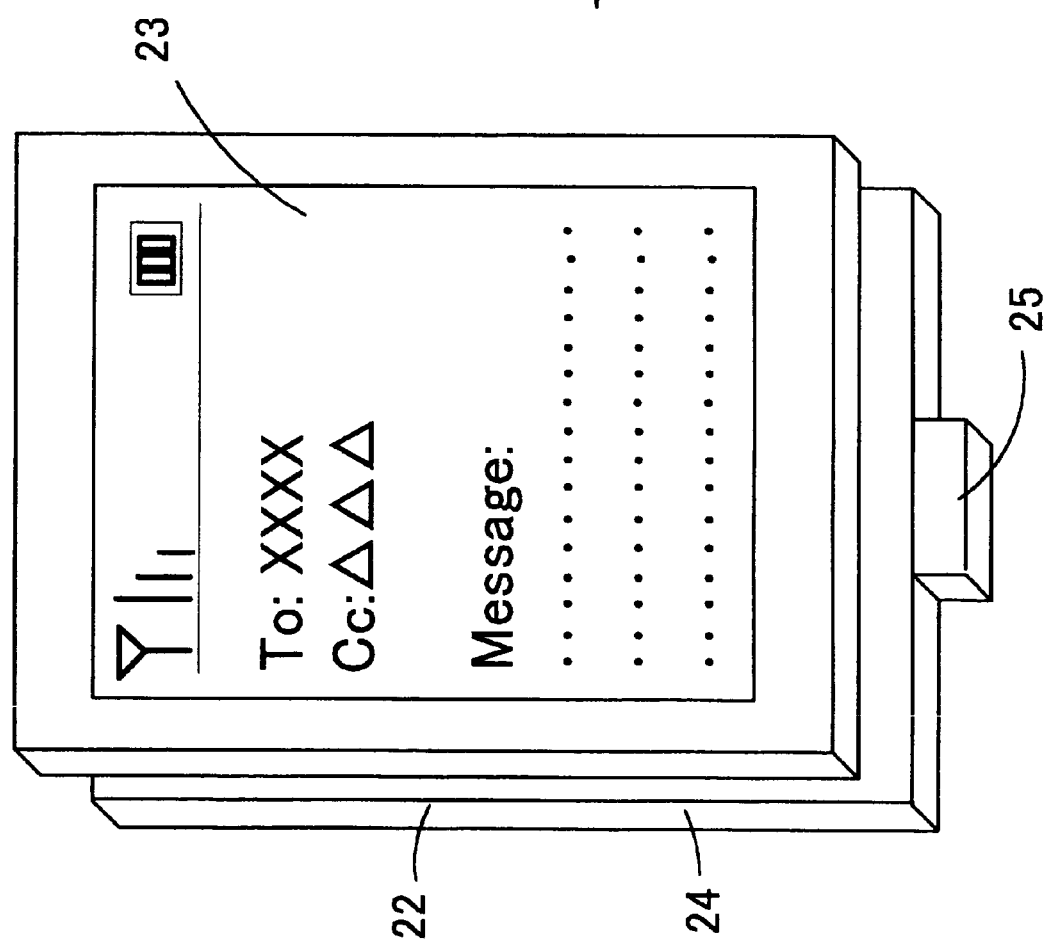

In the double-side display device 61, as shown in FIGS. 25B and 25C, the light source 25 is incorporated into the flip mobile telephone 62 so as to be located on the hinge side of the mobile telephone 62. However, the light source 25 is incorporated such that the front light side (reversible light side) is orientated toward the outer surface side of the mobile telephone 62 while the back light side (the side of the semi-transmissive liquid crystal panel) is orientated toward the inner surface side of the mobile telephone 62. In the case where the mobile telephone 62 is folded as shown in FIG. 25C, because the display unit is often seen from the front face, the image having the good look and good contrast can be seen from the front face when the front face is set to the front light side. In the case where the mobile telephone 62 is opened as shown in FIG. 25B, because the screen is seen from obliquely below as shown in FIGS. 26A and 26B, the image is seen from the brightness peak direction on the back light side. Therefore, the screen can further be brightened and the look of the image can be improved on the back light side.

SIXTH EMBODIMENT

Figure 27A:
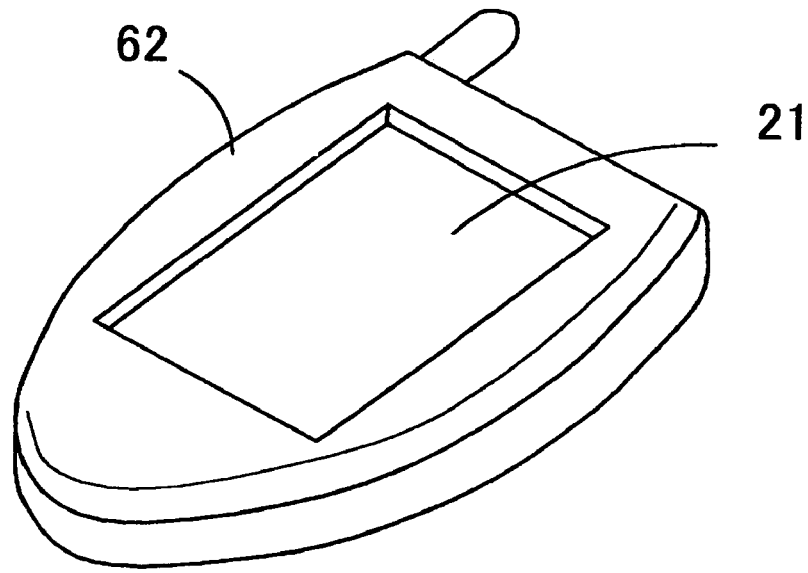
FIGS. 27A and 27B show perspective views of examples of the mobile telephone.
Figure 27B:
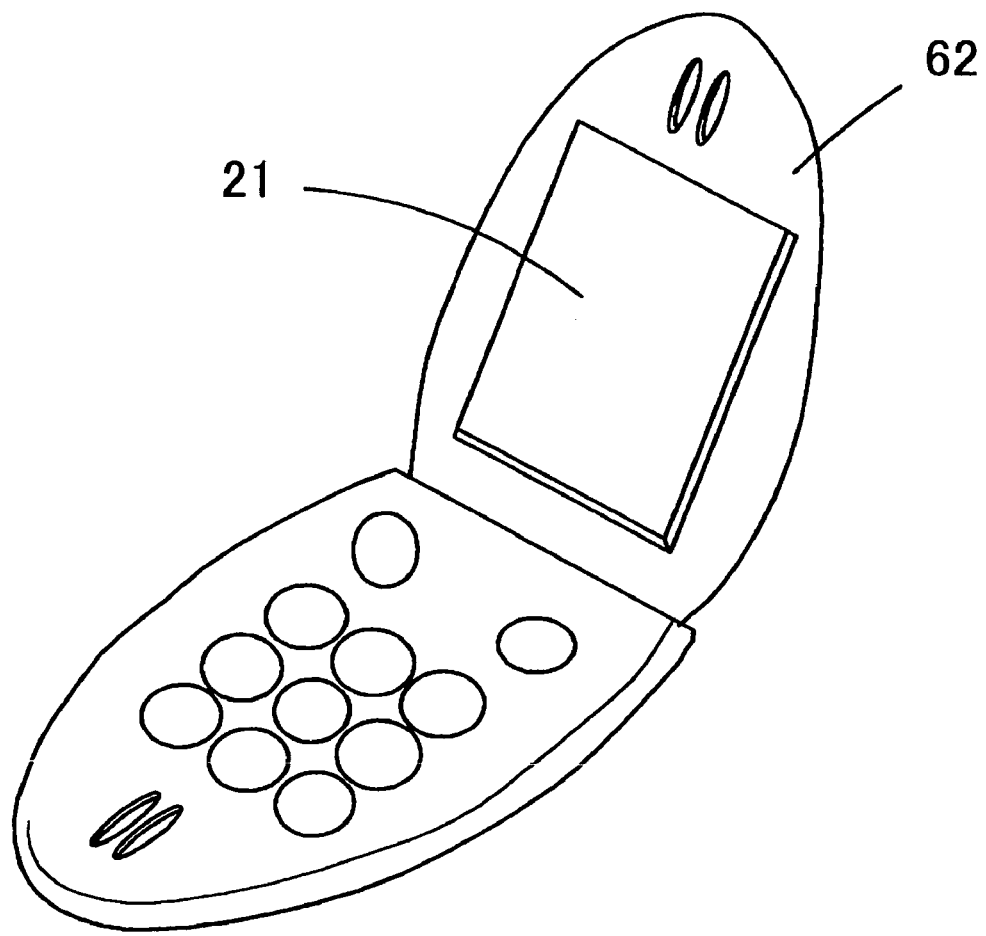

Then, various handheld terminals in which the double-side display device of the invention is included in the display unit will be described. FIG. 27A shows the closed flip mobile telephone 62, and FIG. 27B shows the opened flip mobile telephone 62. In the mobile telephone 62 of FIGS. 27A and 27B, for example, the full-surface display type double-side display device 21 of the first embodiment is incorporated in the display unit.

Figure 28A:
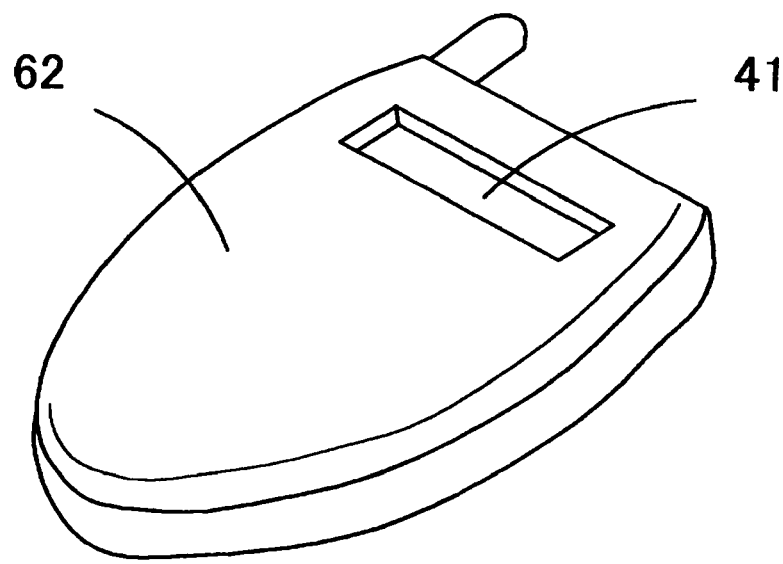
FIGS. 28A and 28B show perspective views of different mobile telephones.
Figure 28B:
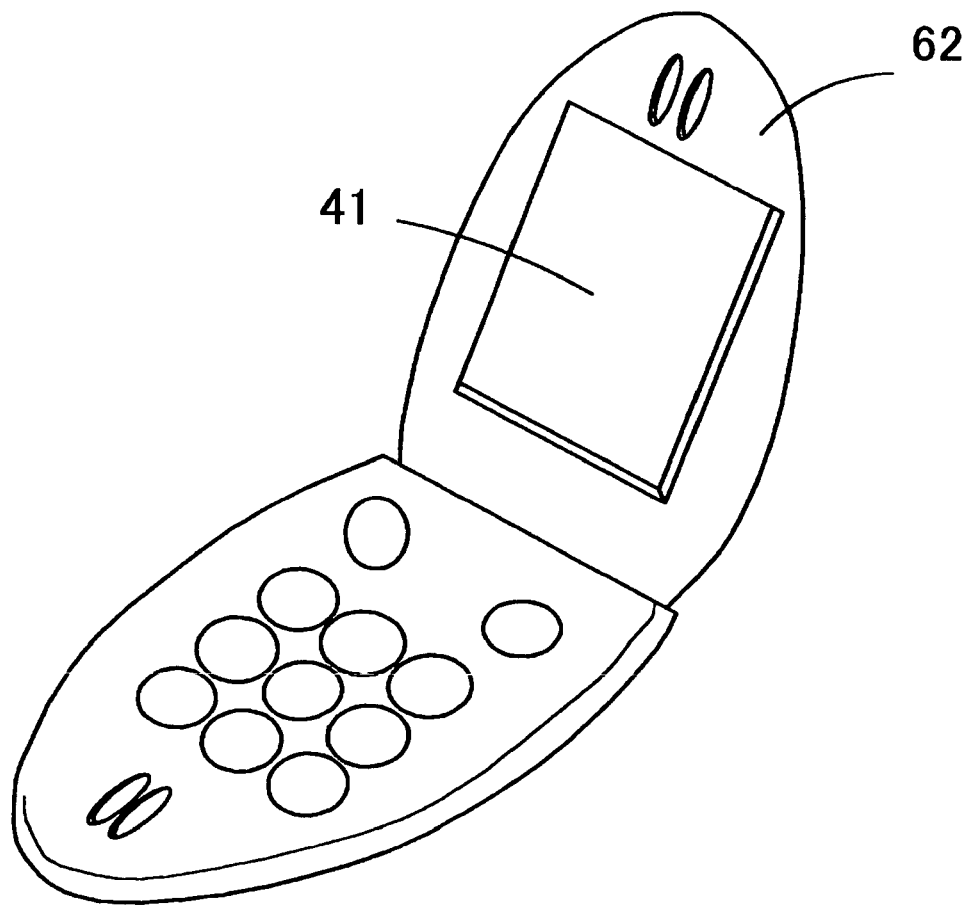

FIG. 28A shows the closed flip mobile telephone 62, and FIG. 28B shows the opened flip mobile telephone 62. In the mobile telephone 62 of FIGS. 28A and 28B, for example, the region splitting type double-side display device 41 of the second embodiment is incorporated in the display unit.

Figure 29A:
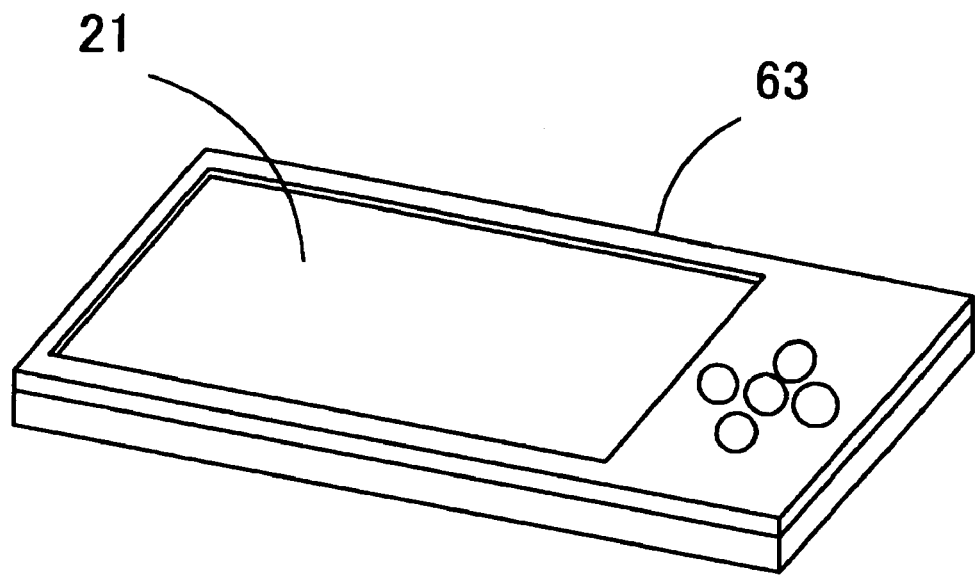
FIGS. 29A and 29B show perspective views of examples of an electronic dictionary.
Figure 29B:
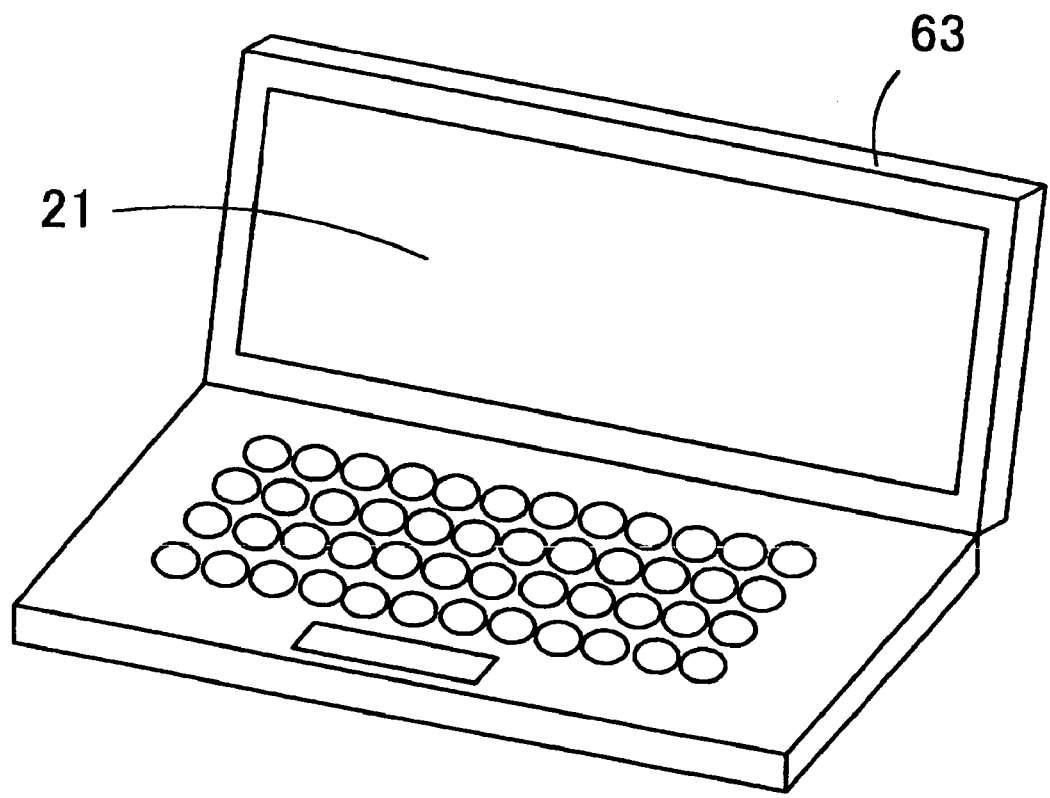

FIG. 29A shows a closed folding electronic dictionary 63, and FIG. 29B shows the opened electronic dictionary 63. In the electronic dictionary 63 of FIGS. 29A and 29B, for example, the full-surface display type double-side display device 21 of the first embodiment is incorporated in the display unit.

Figure 30A:
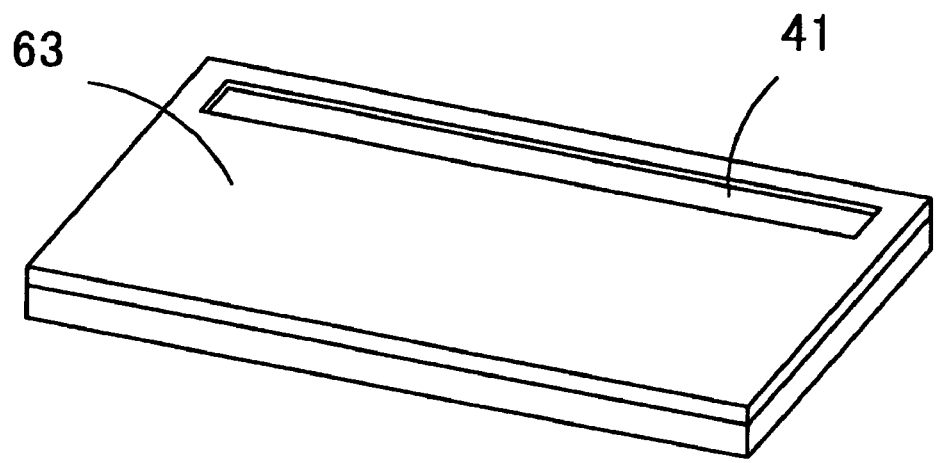
FIGS. 30A and 30B show perspective views of different electronic dictionaries.
Figure 30B:
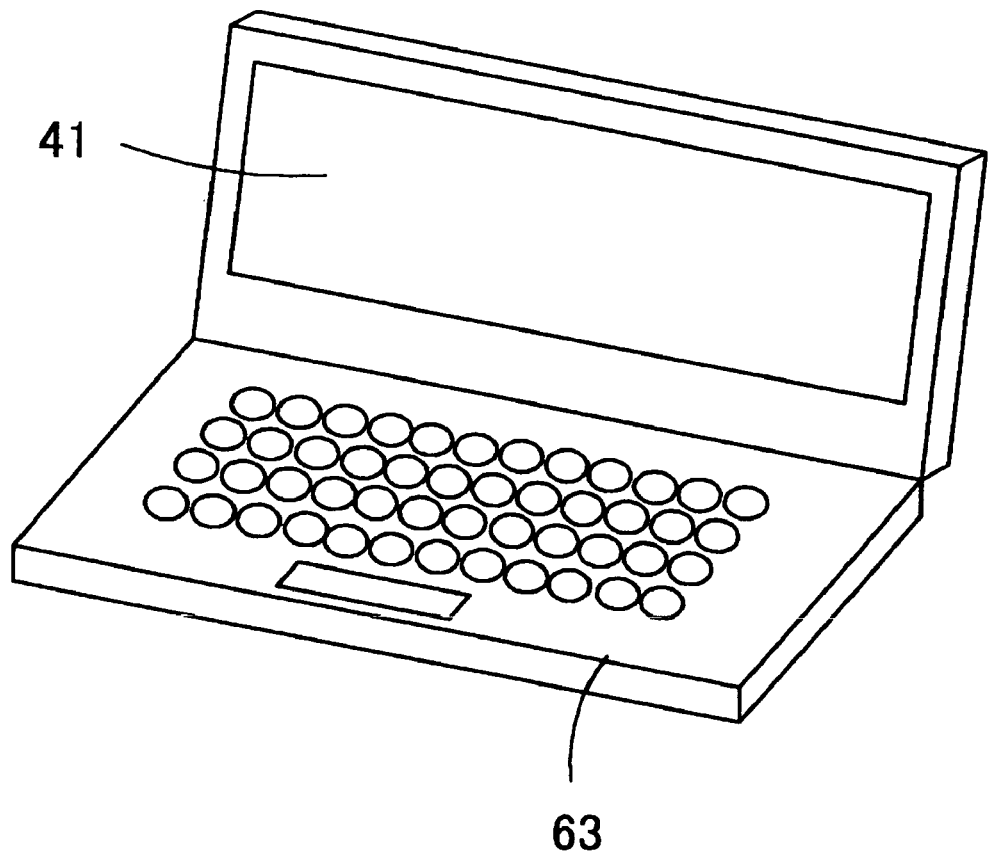

FIG. 30A shows a closed folding electronic dictionary 63, and FIG. 30B shows the opened electronic dictionary 63. In the electronic dictionary 63 of FIGS. 30A and 30B, for example, the region splitting type double-side display device 41 of the second embodiment is incorporated in the display unit.

In addition, the double-side display device of the invention can also be incorporated into a handheld personal computer and other handheld terminals such as an electronic diary, and the double-side display device of the invention can provide the display unit having the good-look image on both the surface and the backside.

What is claimed is:

1. A double-side display device comprising:
   a semi-transmissive liquid crystal panel comprising a liquid crystal layer sealed by sandwiching the liquid crystal layer between two glass substrates, the semi-transmissive liquid crystal panel having a reflecting region and a transmission region; and
   a surface light source device comprising:
      a light guide plate having a light outgoing plane in a principal plane thereof, the light outgoing plane facing the semi-transmissive liquid crystal panel; and
      a light source facing one end face of the light guide plate,
      wherein a plurality of deflection patterns are formed in a surface facing the light outgoing plane of the light guide plate, the deflection pattern including an inclined plane located on a light source side and a re-incident plane substantially perpendicular to the light outgoing plane;
      light emitted by the light source into the light guide plate is reflected by the inclined plane and then the light is outputted from the light outgoing plane; and
      a tilt angle ($\alpha$) of the inclined plane satisfies:

$$45°-[\text{Sin}^{-1}(\text{Sin }\theta/n)]/2 \leq \alpha \leq 45°+[\text{Sin}^{-1}(\text{Sin }\theta/n)]/2,$$

where $\theta$ is an angle formed between a direction of peak brightness of the light outputted from the light outgoing plane and a direction perpendicular to the light outgoing plane, and n is a refractive index of the light guide plate.

2. The double-side display device according to claim 1, wherein the reflecting region and the transmission region are formed in the whole of a display surface in the semi-transmissive liquid crystal panel.

3. The double-side display device according to claim 1, wherein the reflecting region and the transmission region are formed piecewise in the semi-transmissive liquid crystal panel.

4. The double-side display device according to claim 1, wherein a diffusion layer is formed in an opposite plane to a plane facing the light guide plate in the semi-transmissive liquid crystal panel; and
   a diffusion angle of the diffusion layer is substantially equal to half width at half maximum of view angle characteristics of the light outputted from the light outgoing plane of the light guide plate.

5. The double-side display device according to claim 1, wherein a reflecting electrode for forming the reflecting region is formed in the semi-transmissive liquid crystal panel; and the reflecting electrode has diffusion characteristics, and a diffusion angle of the reflecting electrode is substantially equal to half width at half maximum of view angle characteristics of the light outputted from the light outgoing plane of the light guide plate.

6. The double-side display device according to claim 1, wherein the semi-transmissive liquid crystal panel includes an antireflective coat or an antireflective structure in a plane facing the light guide plate.

7. The double-side display device according to claim 1, wherein the direction of the peak brightness of the light outputted from the light outgoing plane of the light guide plate is inclined toward the opposite side to the light source with respect to a normal perpendicular to the light outgoing plane.

8. The double-side display device according to claim 1, wherein the direction of the peak brightness of the light outputted from the light outgoing plane of the light guide plate is inclined toward the light source side with respect to a normal perpendicular to the light outgoing plane.

9. The double-side display device according to claim 1, wherein the light guide plate includes an antireflective coat or an antireflective structure in the light outgoing plane.

10. The double-side display device according to claim 1, wherein the angle $\theta$ is within the range of 6°-15°.

11. The double-side display device according to claim 1, wherein a cross section perpendicular to a lengthwise direction of the deflection pattern is formed in a substantially right-angled triangle in the deflection pattern.

* * * * *